US012062337B2

(12) United States Patent
(10) Patent No.: US 12,062,337 B2
(45) Date of Patent: *Aug. 13, 2024

Yoon et al.

(54) DISPLAY DEVICE AND DRIVING METHOD THEREOF

(71) Applicant: Samsung Display Co., Ltd., Yongin-Si (KR)

(72) Inventors: Hyun-Sik Yoon, Asan-si (KR); Yong-Ju Jeong, Seoul (KR); Daeho Hwang, Hwaseong-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,723

(22) Filed: May 16, 2023

(65) Prior Publication Data

US 2023/0282168 A1 Sep. 7, 2023

Related U.S. Application Data

(63) Continuation of application No. 17/828,263, filed on May 31, 2022, now Pat. No. 11,688,349.

(30) Foreign Application Priority Data

Aug. 3, 2021 (KR) ........................ 10-2021-0101984

(51) Int. Cl.

*G09G 3/3258* (2016.01)
*G09G 3/3291* (2016.01)

(52) U.S. Cl.

CPC ......... *G09G 3/3258* (2013.01); *G09G 3/3291* (2013.01); *G09G 2330/028* (2013.01); *G09G 2330/12* (2013.01)

(58) Field of Classification Search

CPC ........... G09G 2330/12; G09G 2330/04; G09G 2330/02; G09G 2330/026; G09G 2330/08;

(Continued)

(56) References Cited

U.S. PATENT DOCUMENTS

2006/0022971 A1* 2/2006 Luo ...................... G09G 3/3696 345/211
2015/0123552 A1 5/2015 Cao (Continued)

FOREIGN PATENT DOCUMENTS

KR 10-2019-0043372 A 4/2019
KR 10-2020-0034479 A 3/2020

(Continued)

*Primary Examiner* — Dong Hui Liang

(74) *Attorney, Agent, or Firm* — Innovation Counsel LLP

(57) ABSTRACT

Disclosed is a display device including a first output part, a second output part, a power supply circuit connected to input terminals of the first output part and the second output part, a first sensing part connected to an output terminal of the first output part, a second sensing part connected to an output terminal of the second output part, a first voltage output terminal connected to the first sensing part and the second sensing part, a plurality of pixels connected to the first voltage output terminal and configured to display an image, and a defect determination part controlling shutdown of the power supply circuit by comparing a first sensing value and a second sensing value, which are received from the first sensing part and the second sensing part, with a first reference value and a second reference value having a level lower than the first reference value.

14 Claims, 20 Drawing Sheets

(58) Field of Classification Search
CPC ....... G09G 2330/027; G09G 2330/021; G09G 2330/025; G09G 3/3406; G09G 3/006
See application file for complete search history.

(56) References Cited

U.S. PATENT DOCUMENTS

| | | | |
|---|---|---|---|
| 2018/0308448 | A1 | 10/2018 | Lee et al. |
| 2020/0279514 | A1 | 9/2020 | Lee et al. |
| 2021/0003887 | A1 | 1/2021 | Liu |
| 2022/0247164 | A1 | 8/2022 | Chen et al. |

FOREIGN PATENT DOCUMENTS

| | | | |
|---|---|---|---|
| KR | 10-2020-0034483 | A | 3/2020 |
| KR | 10-2020-0037678 | A | 4/2020 |

* cited by examiner

[DSP]

[TP1]

[TP2]

[TP3]

DISPLAY DEVICE AND DRIVING METHOD THEREOF

CROSS-REFERENCE TO RELATED APPLICATIONS

This application is a continuation application of U.S. patent application Ser. No. 17/828,263 filed on May 31, 2022, which claims priority under 35 U.S.C. § 119 to Korean Patent Application No. 10-2021-0101984 filed on Aug. 3, 2021, in the Korean Intellectual Property Office, the disclosures of which are incorporated by reference herein in their entireties.

BACKGROUND

1. Technical Field

The present disclosure relates to a display device and a driving method thereof. More particularly, the present disclosure relates to a display device capable of protecting output parts for outputting a first voltage applied to pixels, and a driving method thereof.

2. Description of the Related Art

In general, an electronic device such as a smart phone, a digital camera, a notebook computer, a navigation device, a smart television, and the like that provides images to a user includes a display device for displaying images. The display device generates an image and then provides the user with the generated image through a display screen.

The display device includes a plurality of pixels for generating an image, a scan driver for applying scan signals to the pixels, a data driver for applying data voltages to the pixels, and a voltage generator for applying an operating voltage to the pixels. The pixels may receive the data voltages in response to the scan signals, and then may generate an image by using the data voltages and the operating voltage.

The operating voltage is output from the voltage generator through a switching element. When an overcurrent flows through the switching element, the switching element may be damaged. There is a need for a protection circuit capable of preventing damage to the switching element.

SUMMARY

Embodiments of the present disclosure provide a display device capable of protecting output parts for outputting a first voltage applied to pixels, and a driving method thereof.

According to an embodiment, a display device includes a first output part, a second output part, a power supply circuit connected to input terminals of the first output part and the second output part, a first sensing part connected to an output terminal of the first output part, a second sensing part connected to an output terminal of the second output part, a first voltage output terminal connected to the first sensing part and the second sensing part, a plurality of pixels connected to the first voltage output terminal and displaying an image, and a defect determination part controlling shutdown of the power supply circuit by comparing a first sensing value and a second sensing value, which are received from the first sensing part and the second sensing part, with a first reference value and a second reference value having a level lower than the first reference value.

According to an embodiment, a method of driving a display device includes applying a first voltage to a pixel through a first voltage output terminal connected to output terminals of a first output part and a second output part, outputting a first sensing value and a second sensing value by sensing a first current and a second current, which are output from the first output part and the second output part, comparing the first sensing value and the second sensing value with a first reference value and a second reference value having a level lower than the first reference value, and controlling shutdown of a power supply circuit connected to input terminals of the first output part and the second output part depending on the comparison result.

According to an embodiment, a display device includes a first output part, a second output part, a power supply circuit connected to input terminals of the first output part and the second output part, a first sensing part connected to an output terminal of the first output part and sensing an open state of the first output part, a second sensing part connected to an output terminal of the second output part and sensing an open state of the second output part, a third sensing part connected to the first sensing part and the second sensing part, a first voltage output terminal connected to the third sensing part, a plurality of pixels connected to the first voltage output terminal and displaying an image, and a defect determination part controlling shutdown of the power supply circuit by comparing a reference value with a third sensing value received from the third sensing part when one of a first sensing value and a second sensing value, which are provided from the first sensing part and the second sensing part, indicates an open state.

According to an embodiment, a method of driving a display device includes applying a first voltage to a pixel through a first voltage output terminal connected to output terminals of a first output part and a second output part, outputting a first sensing value and a second sensing value by sensing open states of the first output part and the second output part, outputting a third sensing value by sensing a current value of the first voltage output terminal, comparing the third sensing value with a reference value when one of the first sensing value and the second sensing value indicates an open state, and controlling shutdown of a power supply circuit depending on the comparison result.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
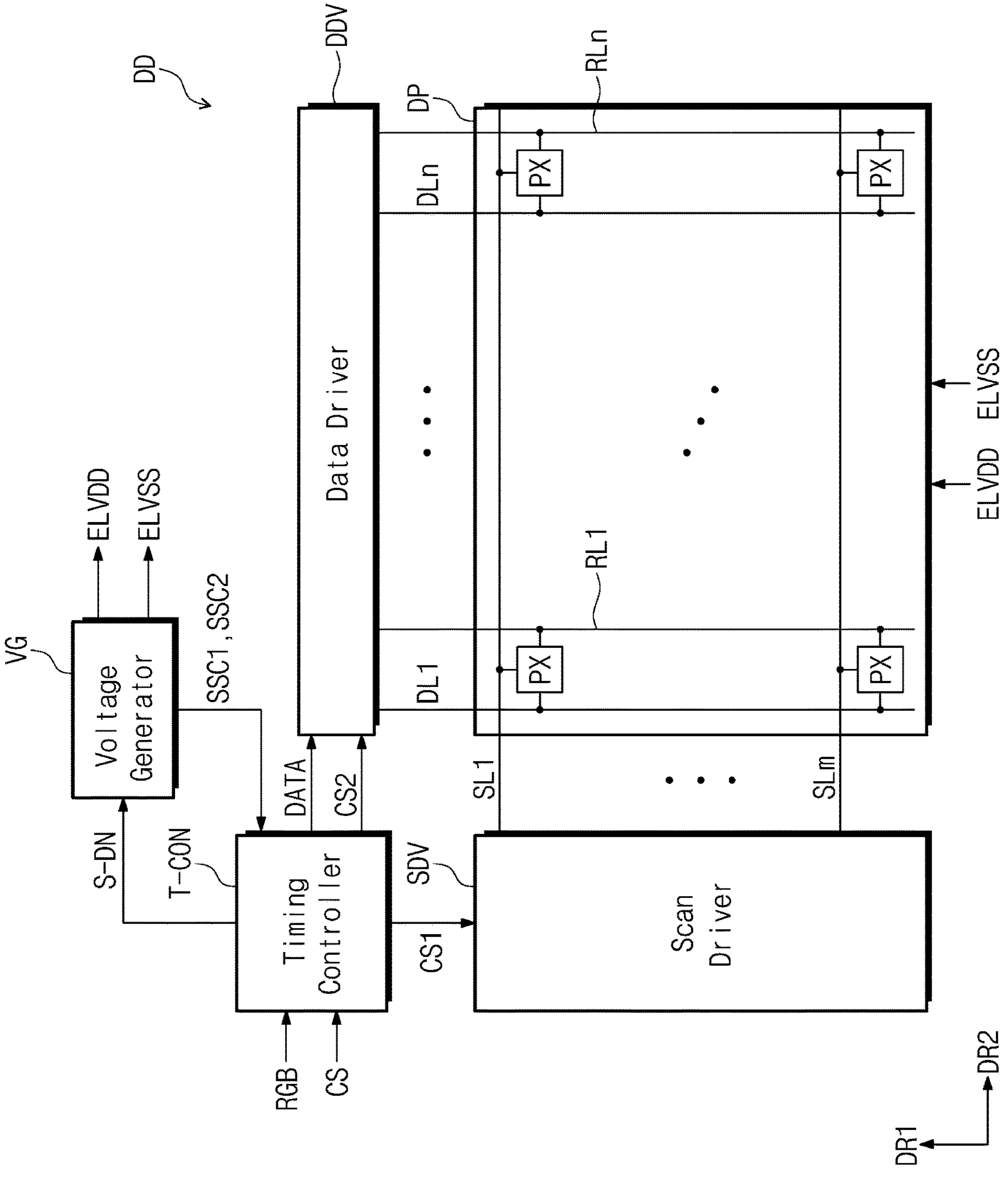
FIG. 1 is a block diagram of a display device, according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents.

The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the present disclosure. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

Unless otherwise defined, all terms (including technical terms and scientific terms) used in this specification have the same meaning as commonly understood by those skilled in the art to which the present disclosure belongs. Furthermore, terms such as terms defined in commonly used dictionaries should be interpreted as having a meaning consistent with the meaning in the context of the related technology, and is explicitly defined herein unless interpreted in ideal or overly formal meanings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Hereinafter, embodiments of the present disclosure will be described with reference to accompanying drawings.

FIG. 1 is a block diagram of a display device, according to an embodiment of the present disclosure.

Referring to FIG. 1, a display device DD may include a display panel DP, a scan driver SDV, a data driver DDV, a timing controller T-CON, and a voltage generator VG. The display panel DP may include a plurality of pixels PX, a plurality of scan lines SL1 to SLm, a plurality of data lines DL1 to DLn, and a plurality of reference lines RL1 to RLn. Each of 'm' and 'n' are a natural number.

The display panel DP according to an embodiment of the present disclosure may be a light emitting display panel, but is not particularly limited thereto. For example, the display panel DP may be an organic light emitting display panel or an inorganic light emitting display panel. A light emitting layer of the organic light emitting display panel may include an organic light emitting material. A light emitting layer of the inorganic light emitting display panel may include a quantum dot, a quantum rod, and the like. Hereinafter, it is described that the display panel DP is an organic light emitting display panel.

The data lines DL1 to DLn and the reference lines RL1 to RLn may extend in a first direction DR1 so as to be connected to the pixels PX and the data driver DDV. The scan lines SL1 to SLm may extend in a second direction DR2 intersecting the first direction DR1 so as to be connected to the pixels PX and the scan driver SDV.

The voltage generator VG may generate a first voltage ELVDD and a second voltage ELVSS and may provide the first voltage ELVDD and the second voltage ELVSS to the display panel DP. The first voltage ELVDD may have a higher level than the second voltage ELVSS. The first voltage ELVDD and the second voltage ELVSS may be applied to the pixels PX.

The timing controller T-CON may receive image signals RGB and a control signal CS from the outside (e.g., a system board). The timing controller T-CON may generate pieces of image data DATA by converting data formats of the image signals RGB so as to be suitable for an interface specification with the data driver DDV. The timing controller T-CON may provide the data driver DDV with the pieces of image data DATA, of which the data format is converted.

The timing controller T-CON may generate and output a scan control signal CS1 and a data control signal CS2 in response to the control signal CS provided from the outside. The scan control signal CS1 may be provided to the scan driver SDV. The data control signal CS2 may be provided to the data driver DDV.

The scan driver SDV may generate a plurality of scan signals in response to the scan control signal CS1. The scan signals may be applied to the pixels PX through the scan lines SL1 to SLm.

The data driver DDV may generate a plurality of data voltages corresponding to the pieces of image data DATA in response to the data control signal CS2. The data voltages may be applied to the pixels PX through the data lines DL1 to DLn.

The pixels PX may receive the data voltages in response to scan signals. The pixels PX may display images by emitting light of luminance corresponding to data voltages The data driver DDV may further apply sensing data voltages to the pixels PX connected to the selected scan line. Sensing pixel currents generated from the pixels PX depending on the sensing data voltages may be provided to the data driver DDV through the reference lines RL1 to RLn. Hereinafter, this operation will be described in detail.

The data driver DDV may sample the sensing pixel currents generated by the pixels PX. As a result, driving features of the pixels PX may be sensed. The timing controller T-CON may update a compensation value for compensating for a change in the driving features of the pixels PX based on the sensing result. The timing controller T-CON may correct the image signals RGB such that the deviation of the driving features of the pixels PX is compensated based on the sensing result, and then may transmit the corrected image signals RGB to the data driver DDV.

An output current corresponding to the first voltage ELVDD may be sensed by the voltage generator VG. The timing controller T-CON may control a shutdown operation of the voltage generator VG based on sensed values (SSC1, SSC2) provided by the voltage generator VG. For example, the timing controller T-CON may output a shutdown signal S-DN for shutting down the voltage generator VG to the voltage generator VG based on the sensed values (SSC1, SSC2). Hereinafter, this operation will be described in detail.

Figure 2:
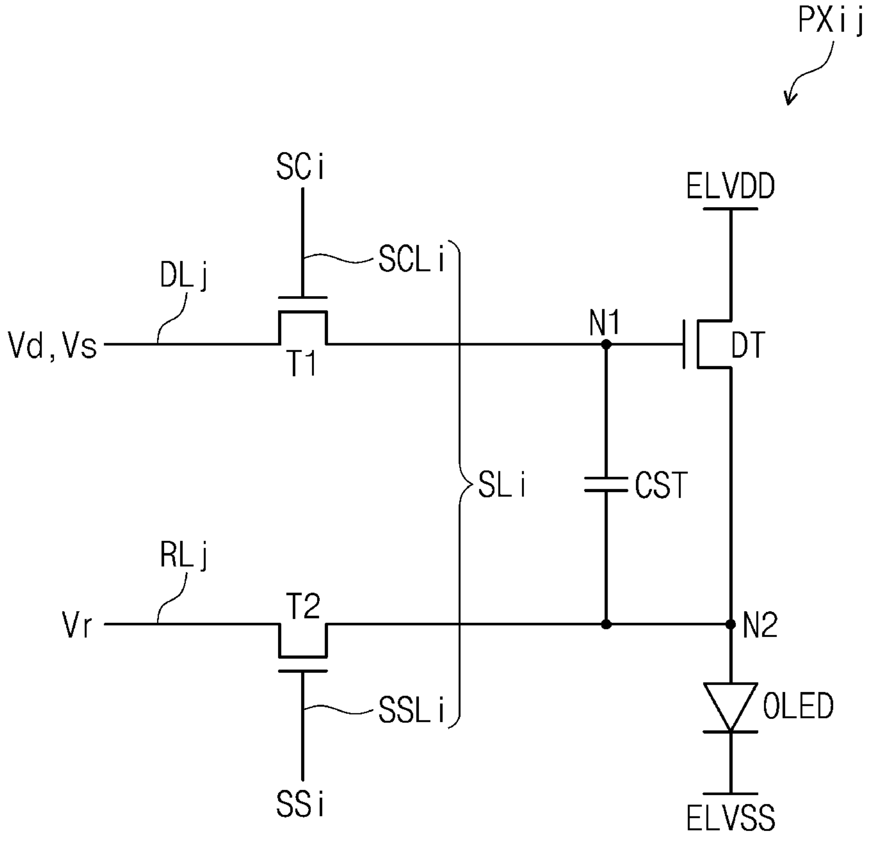
FIG. 2 is a diagram illustrating an equivalent circuit of one pixel shown in FIG. 1.

FIG. 2 is a diagram illustrating an equivalent circuit of one pixel shown in FIG. 1.

In an embodiment, FIG. 2 illustrates a pixel PXij connected to an i-th scan line SLi, a j-th data line DLj, and a j-th reference line RLj. Each of 'i' and 'j' is a natural number.

Referring to FIG. 2, the pixel PXij may be connected to the i-th scan line SLi, the j-th data line DLj, and the j-th reference line RLj. The i-th scan line SLi may include an i-th write scan line SCLi and an i-th sampling scan line SSLi. The i-th write scan line SCLi may receive an i-th write scan signal SCi. The i-th sampling scan line SSLi may receive an i-th sampling scan signal SSi.

The pixel PXij may include a light emitting element OLED, a plurality of transistors (DT, T1, T2), and a capacitor CST. The transistors (DT, T1, T2) may include the driving transistor DT, the first switch transistor T1, and the second switch transistor T2.

The transistors (DT, T1, T2) may be NMOS transistors, but not limited thereto. For example, the transistors (DT, T1, T2) may be PMOS transistors. Each of the transistors (DT, T1, T2) may include a source electrode, a drain electrode, and a gate electrode. Hereinafter, for convenience in the present specification, one of the source electrode and the drain electrode is defined as the first electrode, and the other thereof is defined as the second electrode. Also, the gate electrode is defined as a control electrode.

Hereinafter, the driving transistor DT, the first switch transistor T1, and the second switch transistor T2 are defined as the driving element DT, the first switch element T1, and the second switch element T2, respectively.

The light emitting element OLED may be an organic light emitting element including an anode and a cathode. The anode of the light emitting element OLED may receive the first voltage ELVDD through the driving element DT. The cathode of the light emitting element OLED may receive the second voltage ELVSS. The light emitting element OLED may receive the first voltage ELVDD and the second voltage ELVSS so as to emit light.

The driving element DT may include a first electrode receiving the first voltage ELVDD, a second electrode connected to the anode of the light emitting element OLED, and a control electrode connected to a first node N1.

The capacitor CST may be connected to the control electrode of the driving element DT and the anode of the light emitting element OLED. That is, the capacitor CST may include a first electrode connected to the control electrode of the driving element DT and a second electrode connected to the anode of the light emitting element OLED. A contact where the anode of the light emitting element OLED is connected to the second electrode of the capacitor CST may be defined as a second node N2.

The first switch element T1 may include a first electrode connected to the j-th data line DLj, a second electrode connected to the first node N1, and a control electrode receiving the i-th write scan signal SCi. The j-th data line DLj may receive a data voltage Vd and a sensing data voltage Vs.

The second switch element T2 may include a first electrode connected to the j-th reference line RLj, a second electrode connected to the anode of the light emitting element OLED, and a control electrode for receiving the i-th sampling scan signal SSi. The j-th reference line RLj may receive a reference voltage Vr.

Figure 3:
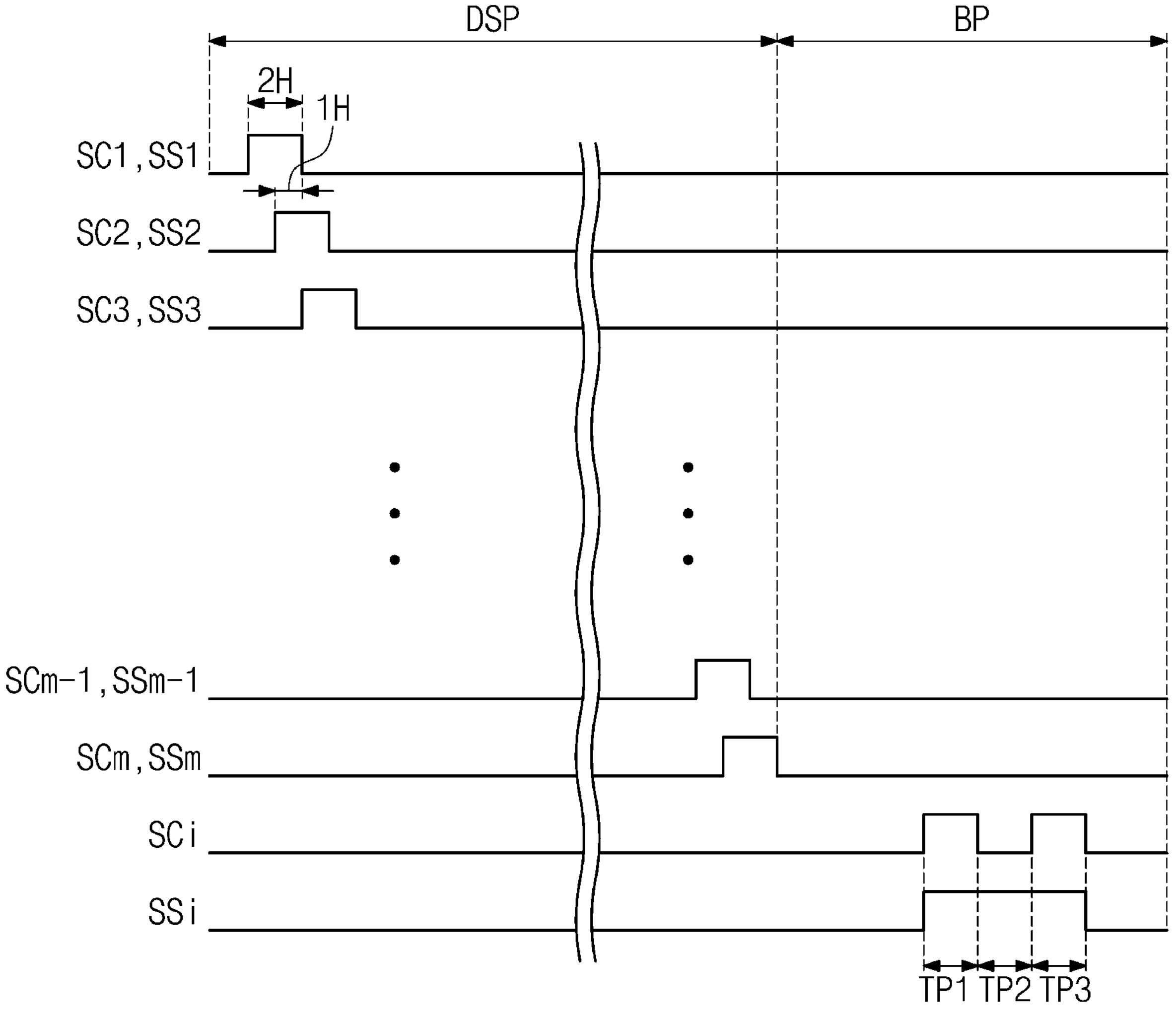
FIG. 3 is a timing diagram of scan signals applied to scan lines shown in FIG. 1.

FIG. 3 is a timing diagram of scan signals applied to scan lines shown in FIG. 1.

Referring to FIGS. 1, 2, and 3, scan signals (SC1~SCm, SS1~SSm) may be sequentially output. The scan signals (SC1~SCm, SS1~SSm) may be applied to the pixels PX through scan lines (SL1~SLm). Although not shown, each of the scan lines (SL1~SLm) shown in FIG. 1 may include the i-th write scan line SCLi and the i-th sampling scan line SSLi shown in FIG. 2.

The scan signals (SC1~SCm, SS1~SSm) may include the write scan signals (SC1'~SCm) and the sampling scan signals (SS1'~SSm). The i-th write scan signal SCi shown in FIG. 2 may be one of the write scan signals (SC1'~SCm). The i-th sampling scan signal SSi shown in FIG. 2 may be one of sampling scan signals (SS1~SSm).

During a display period DSP, the scan signals (SC1~SCm, SS1~SSm) may be output sequentially. During the display period DSP, the write scan signals (SC1~SCm) may be output sequentially. During the display period DSP, the sampling scan signals (SS1~SSm) may be sequentially output. During the display period DSP, the write scan signals (SC1~SCm) and the sampling scan signals (SS1~SSm) may have the same timing as each other.

Hereinafter, in the present specification, an activation period is defined as a high level, and a deactivation period is defined as a low level lower than the high level.

During the display period DSP, the activation period of each of the scan signals (SC1~SCm, SS1~SSm) may have 2H period. During the display period DSP, the scan signals (SC1~SCm, SS1~SSm) may overlap one another by 1H period. For example, the (i+1)-th write scan signal (SCi+1) may overlap the i-th write scan signal SCi by 1H period. The (i+1)-th sampling scan signal (SSi+1) may overlap the i-th sampling scan signal SSi by 1H period.

During a blank period BP following the display period DSP, the pixels PX arranged in one row may be selected by the scan driver SDV, and one write scan signal and one sampling scan signal may be applied to the selected pixels PX.

In an embodiment, the i-th write scan signal SCi may be applied to the pixels PX connected to the i-th write scan line SCLi through the i-th write scan line SCLi. The i-th sampling scan signal SSi may be applied to the pixels PX connected to the i-th sampling scan line SSLi through the i-th sampling scan line SSLi.

The blank period BP may include a first period TP1, a second period TP2, and a third period TP3 that are continuously set. The i-th write scan signal SCi may be activated during the first period TP1 and the third period TP3, and may be deactivated during the second period TP2. The i-th sampling scan signal SSi may be activated during the first period TP1, the second period TP2, and the third period TP3.

Figure 4:
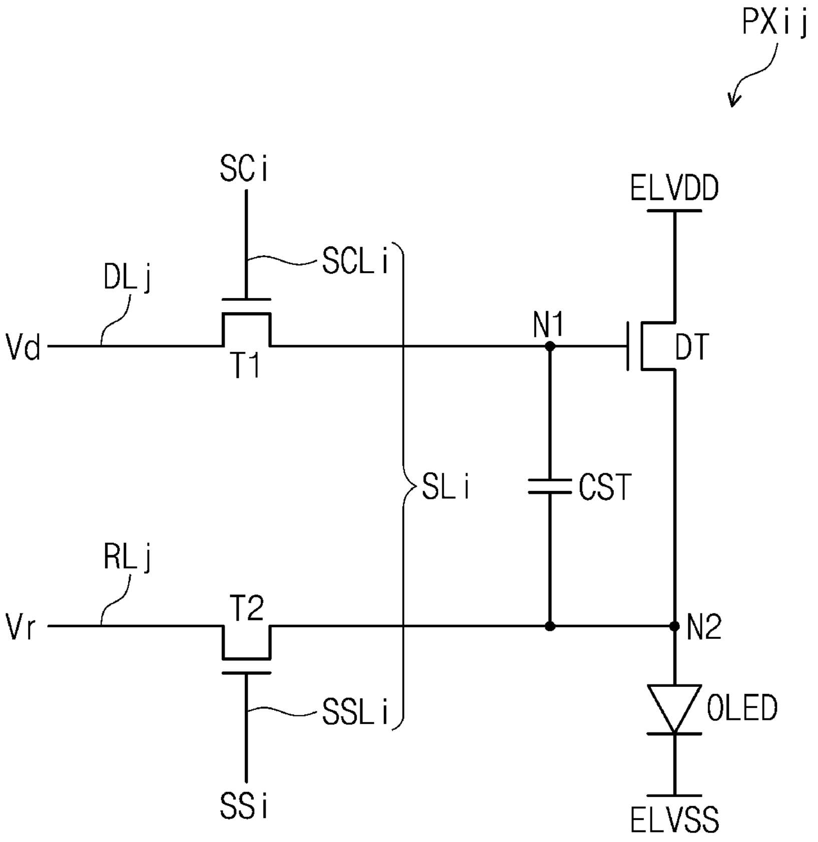
FIG. 4 is a diagram for describing an operation of a pixel during a display period shown in FIG. 3.
Figure 5A:
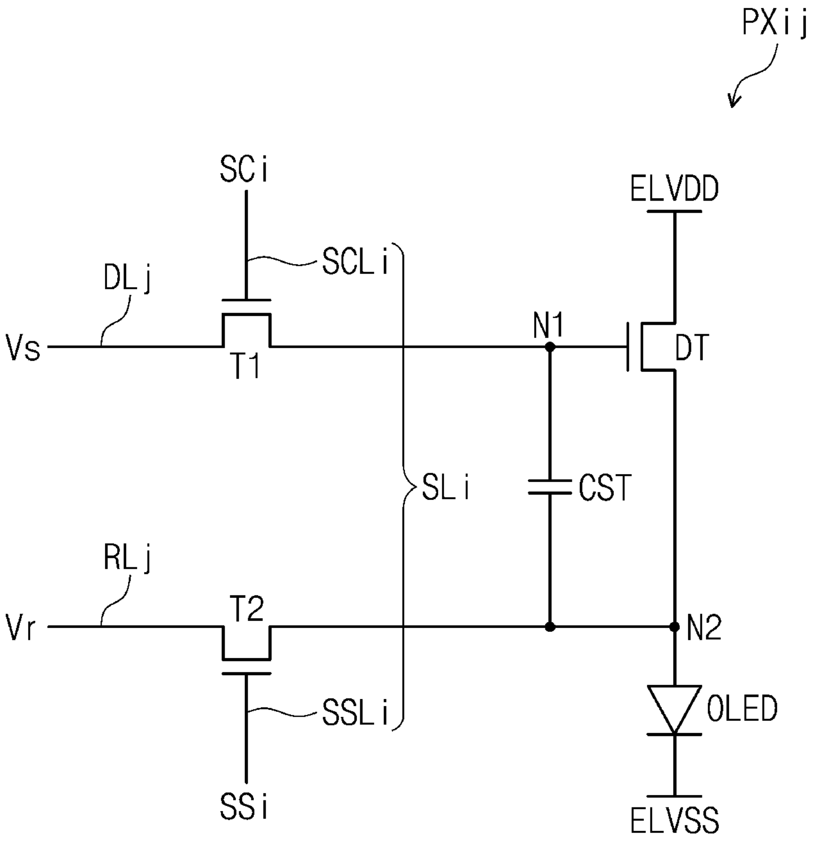
FIGS. 5A, 5B, and 5C are diagrams for describing an operation of a pixel selected during first, second, and third periods illustrated in FIG. 3.
Figure 5B:
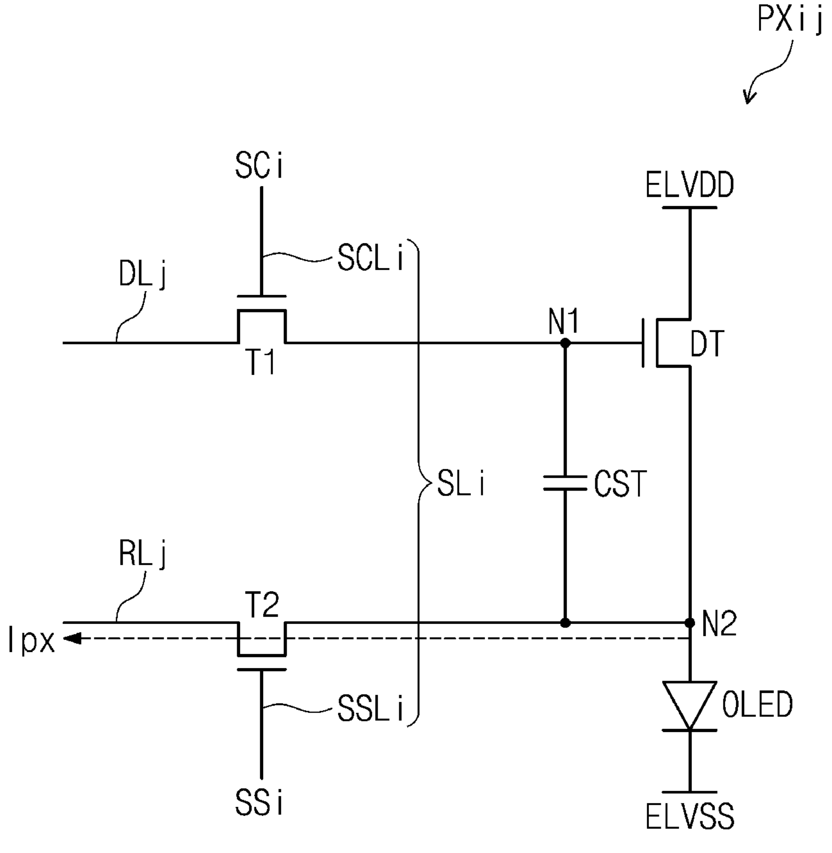
Figure 5C:
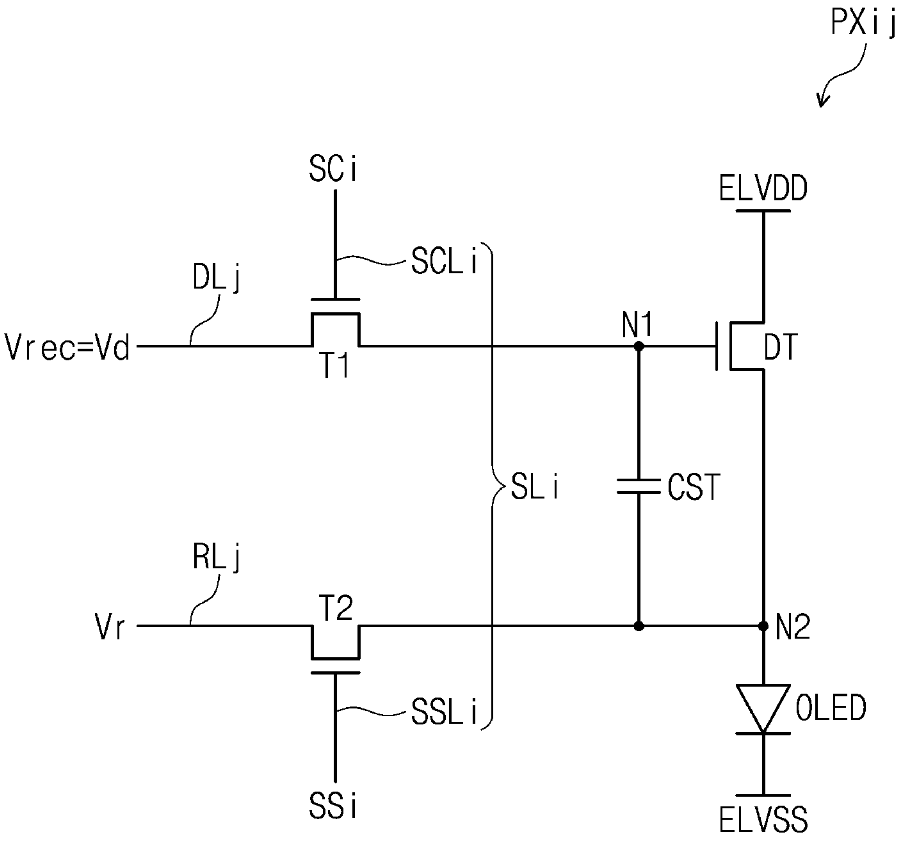

FIG. 4 is a diagram for describing an operation of a pixel during a display period shown in FIG. 3. FIGS. 5A, 5B, and 5C are diagrams for describing an operation of a pixel selected during first, second, and third periods illustrated in FIG. 3.

An operation of the single pixel PXij will be described. However, the other pixels PX not shown will operate in the same manner as the pixel PXij shown in FIG. 4.

Referring to FIGS. 3 and 4, during a program period of the display period DSP, the activated i-th write scan signal SCi and the activated i-th sampling scan signal SSi may be applied to the pixel PXij. The first switch element T1 may be turned on in response to the i-th write scan signal SCi. The second switch element T2 may be turned on in response to the i-th sampling scan signal SSi.

The data voltage Vd may be applied to the control electrode of the driving element DT through the j-th data line DLj. The reference voltage Vr may be applied to the second electrode of the driving element DT through the j-th reference line RLj.

A voltage between the first node N1 and the second node N2 may be set as a difference between the data voltage Vd and the reference voltage Vr. A charge corresponding to the difference between the data voltage Vd and the reference voltage Vr may be charged in the capacitor CST. Accordingly, during the program period, the voltage between the first node N1 (or a gate node) and the second node N2 (or a source node) may be set to match a desired pixel current. The voltage between the first node N1 and the second node N2 may be defined as a gate-source voltage.

During a light emitting period after the program period, the i-th write scan signal SCi and the i-th sampling scan signal SSi are deactivated, and thus the first and second switch elements T1 and T2 may be turned off. The voltage between the first node N1 and the second node N2 may be maintained by the capacitor CST.

Because the voltage between the first node N1 and the second node N2 is greater than a threshold voltage of the driving element DT, a pixel current may flow into the driving element DT during the light emitting period. During the light emitting period, the potential of the first node N1 and the potential of the second node N2 may be boosted by the pixel current while maintaining the voltage between the first node N1 and the second node N2. When the potential of the second node N2 is boosted to an operating point level of the light emitting element OLED, the light emitting element OLED may emit light.

During the display period DSP, the scan signals (SC1~SCm, SS1~SSm) are sequentially applied to the pixels PX, and thus the pixels PX may operate in the same method as an operating method of the pixel PXij.

Referring to FIGS. 3 and 5A, during the first period TP1, the activated i-th write scan signal SCi and the activated i-th sampling scan signal SSi may be applied to the selected pixel PXij. The first switch element T1 and the second switch element T2 may be turned on by the i-th write scan signal SCi and the i-th sampling scan signal SSi.

The sensing data voltage Vs may be applied to the control electrode of the driving element DT through the j-th data line DLj. The reference voltage Vr may be provided to the second electrode of the driving element DT through the j-th reference line RLj. Accordingly, the voltage between the first node N1 (or a gate node) and the second node N2 (or a source node) may be set to match a desired sensing pixel current.

Referring to FIGS. 3 and 5B, during the second period TP2, the i-th write scan signal SCi may be deactivated, and the i-th sampling scan signal SSi may remain in an activated state. The first switch element T1 may be turned off, and the second switch element T2 may remain in an on-state.

A sensing pixel current Ipx flowing through the driving element DT may be provided to the data driver DDV through the second switch element T2 and the j-th reference line RLj. The data driver DDV may sample the sensing pixel current Ipx generated by the pixel PXij. As a result, driving features of the pixels PX may be sensed.

Referring to FIGS. 3 and 5C, during the third period TP3, the i-th write scan signal SCi may be activated, and the i-th sampling scan signal SSi may remain in an activated state. The first switch element T1 may be turned on, and the second switch element T2 may maintain an on state.

A restoration data voltage Vrec may be applied to the control electrode of the driving element DT. The reference voltage Vr may be applied to the second electrode of the driving element DT. The restoration data voltage Vrec may be substantially the data voltage Vd. Accordingly, during the third period TP3, the voltage between the first node N1 and the second node N2 may be restored to an original state of the display period DSP.

Figure 6:
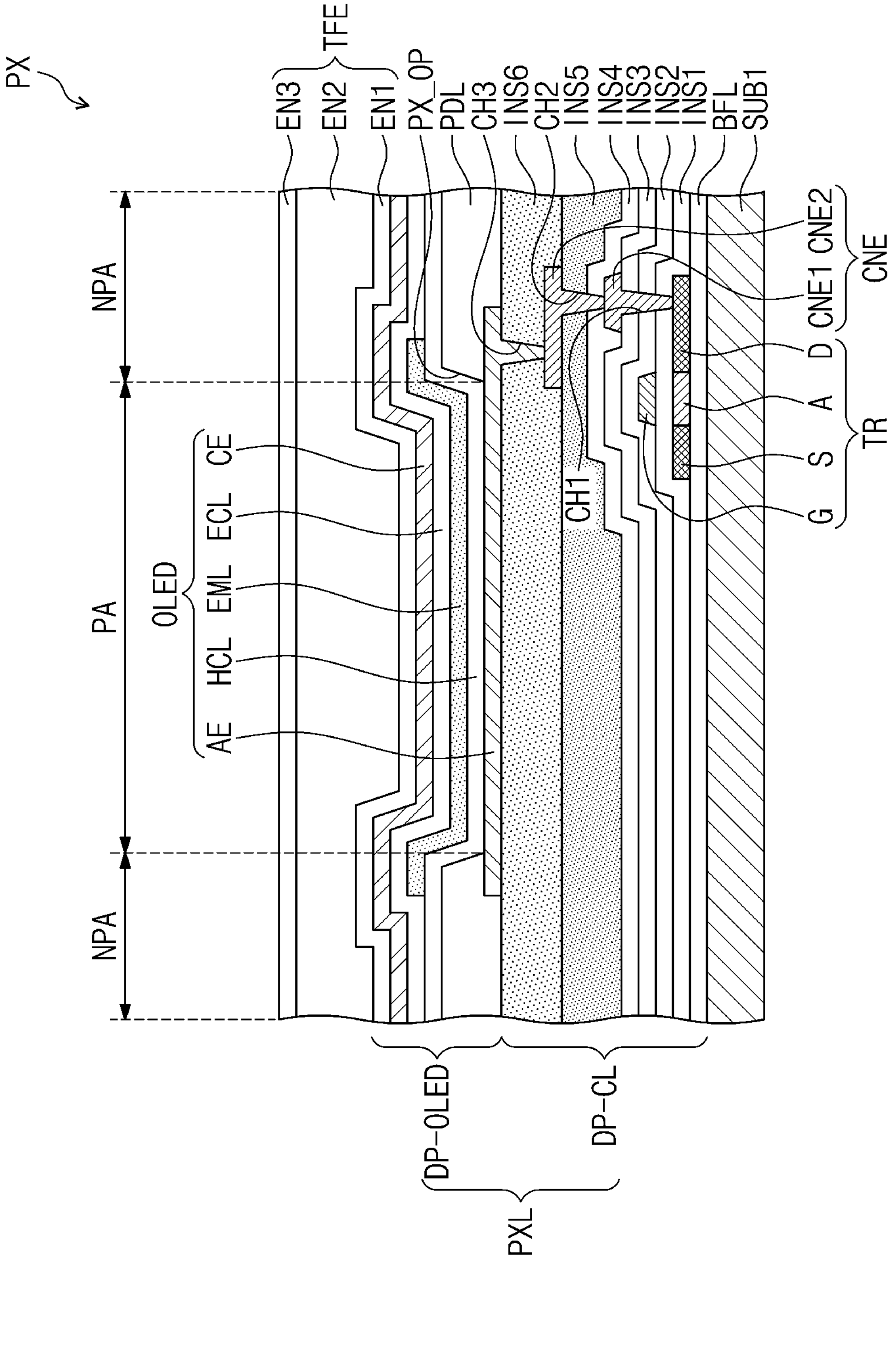
FIG. 6 is a diagram illustrating a cross-section of one pixel illustrated in FIG. 1.

FIG. 6 is a diagram illustrating a cross-section of one pixel illustrated in FIG. 1.

Referring to FIG. 6, the pixel PX may include a transistor TR and a light emitting element OLED. The transistor TR may be a driving element DT shown in FIG. 2. The light emitting element OLED may include a first electrode AE (or anode), a second electrode CE (or cathode), a hole control layer HCL, an electron control layer ECL, and a light emitting layer EML. The transistor TR and the light emitting element OLED may be disposed on a first substrate SUB1.

A planar area of each of the pixels PX may include an emission area PA and a non-emission area NPA around the emission area PA. The light emitting element OLED may be disposed in the emission area PA.

A buffer layer BFL may be disposed on the first substrate SUB1, and the buffer layer BFL may be an inorganic layer. A semiconductor pattern may be disposed on the buffer layer BFL. The semiconductor pattern may include polysilicon, amorphous silicon, or metal oxide.

The semiconductor pattern may be doped with an N-type dopant or a P-type dopant. The semiconductor pattern may include a high doping area and a low doping area. Conductivity of the high doping area may be greater than that of the low doping area. The high doping area may substantially operate as a source electrode or a drain electrode of the transistor TR. The low doping area may substantially correspond to an active (or channel) of a transistor.

A source S, an active A, and a drain D of the transistor TR may be formed from the semiconductor pattern. A first insulating layer INS1 may be disposed on the semiconductor pattern. The gate G of the transistor TR may be disposed on the first insulating layer INS1. A second insulating layer INS2 may be disposed on the gate G. A third insulating layer INS3 may be disposed on the second insulating layer INS2.

To connect the transistor TR and the light emitting element OLED, a connection electrode CNE may include a first connection electrode CNE1 and a second connection electrode CNE2. The first connection electrode CNE1 may be disposed on the third insulating layer INS3, and may be connected to the drain D through a first contact hole CH1 defined in the first to third insulating layers INS1, INS2, and INS3.

A fourth insulating layer INS4 may be disposed on the first connection electrode CNE1. A fifth insulating layer INS5 may be disposed on the fourth insulating layer INS4. The second connection electrode CNE2 may be disposed on the fifth insulating layer INS5. The second connection electrode CNE2 may be connected to the first connection electrode CNE1 through a second contact hole CH2 defined in the fourth and fifth insulating layers INS4 and INS5.

A sixth insulating layer INS6 may be disposed on the second connection electrode CNE2. Layers from the buffer layer BFL to the sixth insulating layer INS6 may be defined as a circuit element layer DP-CL. The first to sixth insulating layers INS1, INS2, INS3, INS4, INS5, and INS6 may be inorganic layers or organic layers.

The first electrode AE may be disposed on the sixth insulating layer INS6. The first electrode AE may be connected to the second connection electrode CNE2 through a third contact hole CH3 defined in the sixth insulating layer INS6. A pixel defining layer PDL in which an opening PX_OP for exposing a predetermined portion of the first electrode AE is defined may be disposed on the first electrode AE and the sixth insulating layer INS6.

The hole control layer HCL may be disposed on the first electrode AE and the pixel defining layer PDL. The hole control layer HCL may include a hole transport layer and a hole injection layer.

The light emitting layer EML may be disposed on the hole control layer HCL. The light emitting layer EML may be disposed in an area corresponding to the opening PX_OP. The light emitting layer EML may include an organic material and/or an inorganic material. The light emitting layer EML may generate blue light.

The electron control layer ECL may be disposed on the light emitting layer EML and the hole control layer HCL. The electron control layer ECL may include an electron transport layer and an electron injection layer. The hole control layer HCL and the electron control layer ECL may be disposed in common in the emission area PA and the non-emission area NPA.

The second electrode CE may be disposed on the electron control layer ECL. The second electrode CE may be disposed in the pixels PX in common. A layer on which the light emitting element OLED is disposed may be defined as a display element layer DP-OLED. The circuit element layer DP-CL and the display element layer DP-OLED may be defined as a pixel layer PXL.

The thin film encapsulation layer TFE may be disposed on the second electrode CE to cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2. Each of the first and third encapsulation layers EN1 and EN3 may include an inorganic insulating layer, and may protect the pixel PX from moisture/oxygen. The second encapsulation layer EN2 includes an organic insulating layer and may protect the pixel PX from foreign objects such as dust particles.

The first voltage ELVDD may be applied to the first electrode AE through the transistor TR, and the second voltage ELVSS may be applied to the second electrode CE. Excitons may be formed by coupling holes and electrons injected into the light emitting layer EML. As the excitons transition to a ground state, the light emitting element OLED may emit light.

Figure 7:
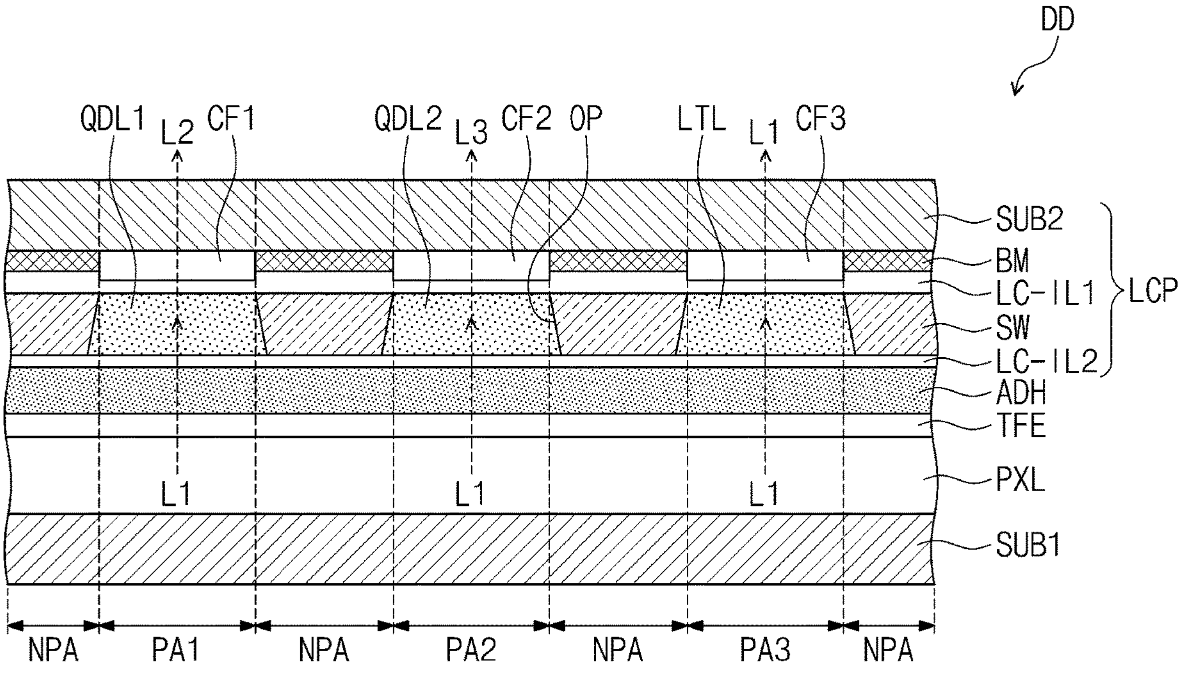
FIG. 7 is a diagram illustrating a cross-section of a light conversion part disposed on a pixel layer shown in FIG. 6.

FIG. 7 is a diagram illustrating a cross-section of a light conversion part disposed on a pixel layer shown in FIG. 6.

FIG. 7 illustrates first, second, and third emission areas (PA1, PA2, PA3). The emission area PA shown in FIG. 6 may be one of first, second, and third emission areas (PA1, PA2, PA3). Besides, for convenience of description, in FIG. 7, cross-sectional structures of the transistor TR and the light emitting element OLED shown in FIG. 6 are omitted, and the pixel layer PXL is illustrated as a single layer.

Referring to FIG. 7, the display device DD may include a light conversion part LCP disposed on the thin film encapsulation layer TFE. The light conversion part LCP may be attached on the thin film encapsulation layer TFE by an adhesive layer ADH.

An area between the first, second, and third emission areas (PA1, PA2, PA3) may be defined as the non-emission area NPA. The first, second, and third emission areas (PA1, PA2, PA3) may generate first light L1. Herein, the first light L1 may be blue light.

The light conversion part LCP may include a second substrate SUB2, first and second quantum dot layers (QDL1, QDL2), a light transmitting layer LTL, first, second, and third color filters (CF1, CF2, CF3), a black matrix BM, a side wall layer SW, and first and second insulating layers (LC-IL1, LC-IL2). The first and second quantum dot layers (QDL1, QDL2), the light transmitting layer LTL, the first, second, and third color filters (CF1, CF2, CF3), the black matrix BM, and the side wall layer SW may be interposed between the second substrate SUB2 and the thin film encapsulation layer TFE.

The first, second, and third color filters (CF1, CF2, CF3) and the black matrix BM may be disposed under the second substrate SUB2. The first, second, and third color filters (CF1, CF2, CF3) may overlap the first, second, and third emission areas (PA1, PA2, PA3), respectively. The black matrix BM may overlap the non-emission area NPA.

The first color filter CF1 may overlap the first emission area PA1, the second color filter CF2 may overlap the second emission area PA2, and the third color filter CF3 may overlap the third emission area PA3. The first color filter CF1 may include a red color filter. The second color filter CF2 may include a green color filter. The third color filter CF3 may include a blue color filter.

The first insulating layer LC-IL1 may be disposed under the first, second, and third color filters (CF1, CF2, CF3) and the black matrix BM. The side wall layer SW may be disposed under the first insulating layer LC-IL1.

Openings OP for disposing the first and second quantum dot layers (QDL1, QDL2) and the light transmitting layer LTL may be defined by the side wall layer SW. The openings OP may overlap the first, second, and third emission areas (PA1, PA2, PA3). The side wall layer SW may overlap the non-emission area NPA. The side wall layer SW may have a black color, but the color of the side wall layer SW is not limited thereto.

The first and second quantum dot layers (QDL1, QDL2) and the light transmitting layer LTL may be disposed under the first insulating layer LC-ILL The first and second quantum dot layers (QDL1, QDL2) and the light transmitting layer LTL may be disposed in the openings OP.

The first and second quantum dot layers (QDL1, QDL2) and the light transmitting layer LTL may overlap the first, second, and third emission areas (PA1, PA2, PA3), respectively. The first quantum dot layer QDL1 may overlap the first emission area PA1, the second quantum dot layer QDL2 may overlap the second emission area PA2 and, the light transmitting layer LTL may overlap the third emission area PA3.

The first light L1 generated in the first, second, and third emission areas (PA1, PA2, PA3) may be provided to the first and second quantum dot layers (QDL1, QDL2) and the light transmitting layer LTL. The first light L1 generated in the first emission area PA1 may be provided to the first quantum dot layer QDL1; and, the first light L1 generated in the second emission area PA2 may be provided to the second quantum dot layer QDL2. The first light L1 generated in the third emission area PA3 may be provided to the light transmitting layer LTL.

The first quantum dot layer QDL1 may convert the first light L1 into a second light L2. The second quantum dot layer QDL2 may convert the first light L1 into a third light L3. The second light L2 may be a red light, and the third light L3 may be a green light. The first quantum dot layer QDL1 may include first quantum dots (not shown). The second quantum dot layer QDL2 may include second quantum dots (not shown). The light transmitting layer LTL may include light scattering particles (not shown) for scattering light.

The first quantum dots may convert the first light L1 having a blue wavelength band into the second light L2 having a red wavelength band. The second quantum dots may convert the first light L1 having a blue wavelength band into the third light L3 having a green wavelength band. The first and second quantum dots may scatter the second light L2 and the third light L3. The light transmitting layer LTL may transmit the first light L1 without performing a light conversion operation. The light transmitting layer LTL may emit light by scattering the first light L1 through the light scattering particles.

The first quantum dot layer QDL1 may emit the second light L2. The second quantum dot layer QDL2 may emit the third light L3. The light transmitting layer LTL may emit the first light L1. Accordingly, a predetermined image may be displayed by the second light L2, the third light L3, and the first light L1 that display red, green, and blue, respectively.

Without light conversion being performed by the first quantum dots, a part of the first light L1 may pass through the first quantum dot layer QDL1 and then may be provided to the first color filter CF1. That is, some of the first light L1 is not converted into the second light L2 because the first light L1 is not in contact with the first quantum dots. The first color filter CF1 may block light of other colors. The first light L1 that is not converted in the first quantum dot layer QDL1 may be blocked by the first color filter CF1 having a red color filter, and thus may not be emitted toward the upper layer.

Without light conversion being performed by the second quantum dots, a part of the first light L1 may pass through the second quantum dot layer QDL2 and then may be provided to the second color filter CF2. That is, some of the first light L1 is not converted into the third light L3 because the first light L1 is not in contact with the second quantum dots. The second color filter CF2 may block light of other colors. The first light L1 that is not converted in the second quantum dot layer QDL2 may be blocked by the second color filter CF2 having a green color filter, and thus may not be emitted toward the upper layer.

External light may be provided toward the display device DD. When the external light is reflected from the display panel DP and provided to an external user, the user may visually perceive the external light, like a mirror.

The first, second, and third color filters (CF1, CF2, CF3) may prevent reflection of the external light. For example, the first, second, and third color filters (CF1, CF2, CF3) may filter the external light into red, green, and blue colors. That is, the first, second, and third color filters (CF1, CF2, CF3) may filter external light with the same color as the second light L2, the third light L3, or the first light L1. In this case, the external light may not be perceived by the user.

The black matrix BM may block unnecessary light in the non-emission area NPA. The side wall layer SW having black color may also have a function similar to the black matrix BM, and may block unnecessary light in the non-emission area NPA.

Figure 8:
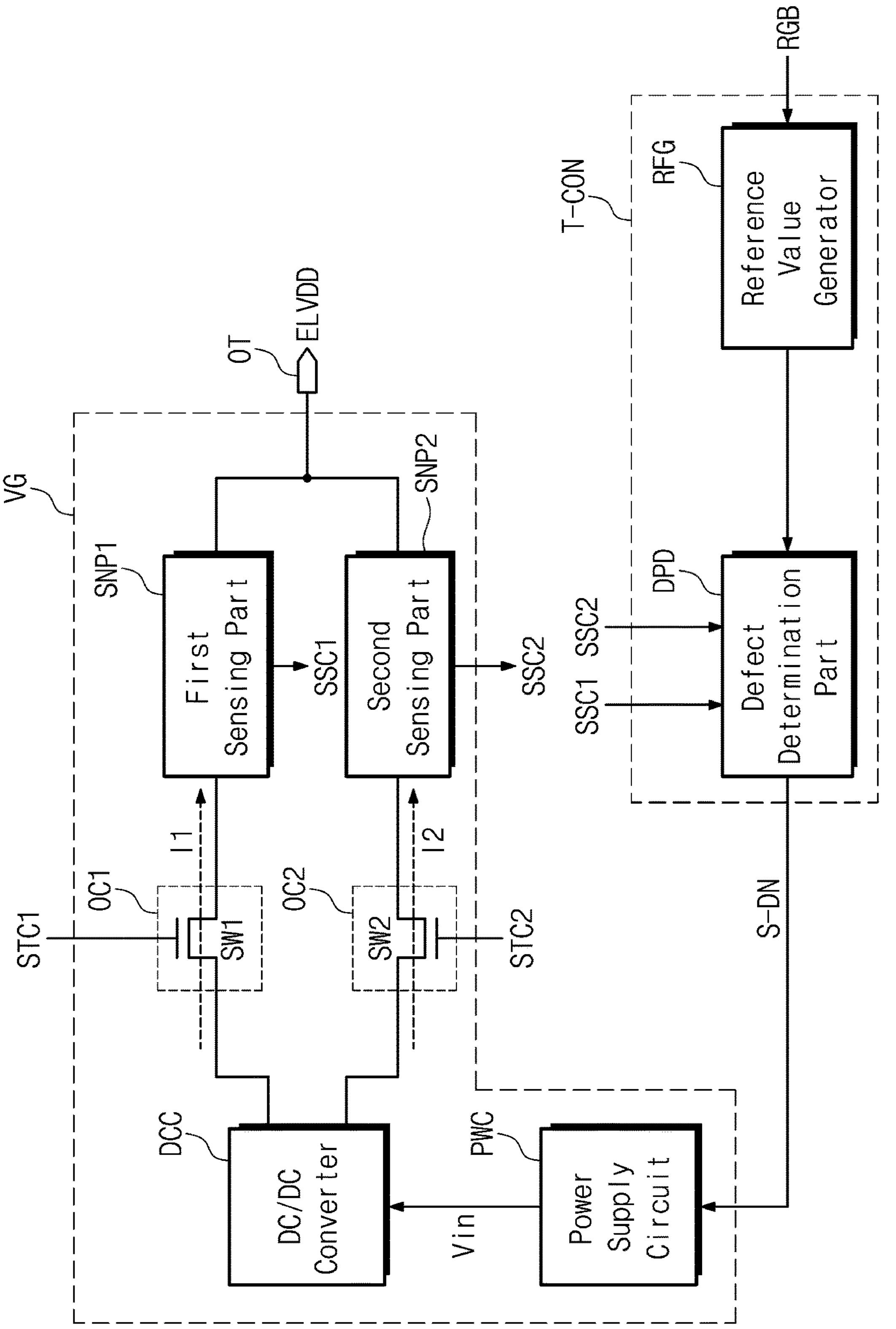
FIG. 8 is a diagram illustrating a configuration of a voltage generator and a timing controller shown in FIG. 1.

FIG. 8 is a diagram illustrating a configuration of a voltage generator and a timing controller shown in FIG. 1.

Referring to FIG. 8, the voltage generator VG may include a power supply circuit PWC, a DC/DC converter DCC, a first output part OC1, a second output part OC2, a first sensing part SNP1, and a second sensing part SNP2. The timing controller T-CON is a configuration for controlling the operation of the voltage generator VG, and may include a defect determination part DPD and a reference value generator RFG.

The power supply circuit PWC may generate an input voltage Vin. The input voltage Vin may be provided to the DC/DC converter DCC. The DC/DC converter DCC may be connected to the input terminals of the first and second output parts (OC1, OC2). The power supply circuit PWC may be connected to the input terminals of the first and second output parts (OC1, OC2) through the DC/DC converter DCC.

The DC/DC converter DCC may change the input voltage Vin into a voltage having a level suitable to be used in the display panel DP and then may output the voltage having a suitable level. For example, the display panels DP may be manufactured with a specification suitable to be used in a television or a mobile phone. In this case, the magnitudes of voltages used in the display panels DP may be different from each other. The DC/DC converter DCC may change the input voltage Vin into a voltage having a level suitable to be used in the display panel DP and then may provide the first and second output parts (OC1, OC2) with the voltage having a suitable level.

The first output part OC1 may output a first current I1. The second output part OC2 may output a second current I2. Output terminals of the first and second output parts (OC1, OC2) may be connected to a first voltage output terminal OT in common. The first and second currents I1 and I2 output from the first and second output parts (OC1, OC2) may be output through the first voltage output terminal OT. The first and second currents (I1, I2) may be summed and output through the first voltage output terminal OT. A value obtained by summing the first and second currents (I1, I2) may correspond to the first voltage ELVDD.

The first voltage ELVDD may be output through the first voltage output terminal OT. The first voltage output terminal OT may be connected to the pixels PX. The first voltage ELVDD may be applied to the pixels PX through the first voltage output terminal OT.

The first output part OC1 may include a first switching element SW1. The second output part OC2 may include a second switching element SW2. Each of the first and second switching elements SW1 and SW2 may include a transistor having a source electrode, a drain electrode, and a gate electrode. Hereinafter, for convenience of description, one of the source electrode and the drain electrode of each of the first and second switching elements (SW1, SW2) is defined as an input electrode, and the other thereof is defined as an output electrode. Also, the gate electrode is defined as a control electrode.

The input electrodes of the first and second switching elements (SW1, SW2) may constitute input terminals of the first and second switching elements (SW1, SW2), and may be connected to the DC/DC converter DCC. The output electrodes of the first and second switching elements (SW1, SW2) constitute output terminals of the first and second switching elements (SW1, SW2), and may be connected to the first voltage output terminal OT in common.

A control electrode of the first switching element SW1 may receive a first switching control signal STC1. A control electrode of the second switching element SW2 may receive a second switching control signal STC2. The first and second switching control signals (STC1, STC2) may be provided from a system board.

When the display panel DP operates to drive the pixels PX of the display panel DP, the first and second switching control signals (STC1, STC2) may be applied to the control electrodes of the first and second switching elements (SW1, SW2), respectively. As a result, the first and second switching elements (SW1, SW2) may be turned on. The first current I1 may be output through the first switching element SW1 thus turned on. The second current I2 may be output through the second switching element SW2 thus turned on.

The first sensing part SNP1 may be connected to the output terminal of the first output part OC1. The second sensing part SNP2 may be connected to the output terminal of the second output part OC2. The first and second sensing parts (SNP1, SNP2) may be connected to the first voltage output terminal OT in common.

The first sensing part SNP1 may be interposed between the output terminal of the first output part OC1 and the first voltage output terminal OT. That is, the first sensing part SNP1 may be connected in series between the output terminal of the first output part OC1 and the first voltage output terminal OT. The second sensing part SNP2 may be interposed between the output terminal of the second output part OC2 and the first voltage output terminal OT. That is, the second sensing part SNP2 may be connected in series between the output terminal of the second output part OC2 and the first voltage output terminal OT.

The first sensing part SNP1 may sense the first current I1 output through the first output part OC1 and may output the first current I1 as a first sensing value SSC1. The second sensing part SNP2 may sense the second current I2 output through the second output part OC2 and may output the second current I2 as a second sensing value SSC2. Each of the first and second sensing parts (SNP1, SNP2) may be implemented with a sensing IC capable of sensing current in detail. The first and second sensing values (SSC1, SSC2) may be provided to the defect determination part DPD.

The defect determination part DPD may receive the first and second sensing values (SSC1, SSC2). The defect determination part DPD may receive a first reference value RF1 and a second reference value RF2 from the reference value generator RFG. The second reference value RF2 may have a lower level than the first reference value RF1.

The defect determination part DPD may control the shutdown of the power supply circuit PWC by comparing the first and second sensing values (SSC1, SSC2) with the first and second reference values (RF1, RF2). For example, when one of the first and second sensing values (SSC1, SSC2) is greater than the first reference value RF1, and the other of the first and second sensing values (SSC1, SSC2) is less than the second reference value RF2, the defect determination part DPD may count the comparison result. Under conditions other than the above-described condition, the defect determination part DPD may not count the comparison result.

When the counting value is greater than the reference counting value, the defect determination part DPD may output the shutdown signal S-DN for shutting down the power supply circuit PWC to the power supply circuit PWC. The power supply circuit PWC may be shut down in response to the shutdown signal S-DN. Hereinafter, this operation will be described in detail.

The reference value generator RFG may receive the image signals RGB to be used in the display panel DP from a system board. The image signals RGB to be used in the display panel DP may be image signals RGB having minimum to maximum luminance values. Some image signals RGB, which are to be displayed during each frame, from among the image signals RGB, may be provided to the timing controller T-CON.

The reference value generator RFG may generate the first reference value RF1 and the second reference value RF2 based on pieces of current data corresponding to the image signals RGB. When the display panels DP are manufactured with specifications suitable to be used in televisions or mobile phones, magnitudes of the image signals RGB used in the display panels DP may be different from one another. The magnitudes of the image signals RGB may correspond to current values or voltage values.

The magnitudes of the image signals RGB provided to the display panel DP to be used in a television may be different from the magnitudes of the image signals RGB provided to the display panel DP to be used in a mobile phone. The reference value generator RFG may receive the image signals RGB and may generate the first reference value RF1 and the second reference value RF2 based on the magnitudes of the image signals RGB. The reference value generator RFG may generate the first reference value RF1 and the second reference value RF2 based on pieces of current data corresponding to the image signals RGB.

The first reference value RF1 may be set to a value less than the maximum value among pieces of current data. The maximum value among pieces of current data may indicate the maximum luminance. The second reference value RF2 may be set to a value greater than a minimum value among pieces of current data. The minimum value among pieces of current data may indicate a minimum luminance.

Each of the first and second currents (I1, I2) may have various values. For example, the first and second currents (I1, I2) may include first and second currents (I1M, I2M, I1M', I1L, I20), which will be described below.

Figure 9:
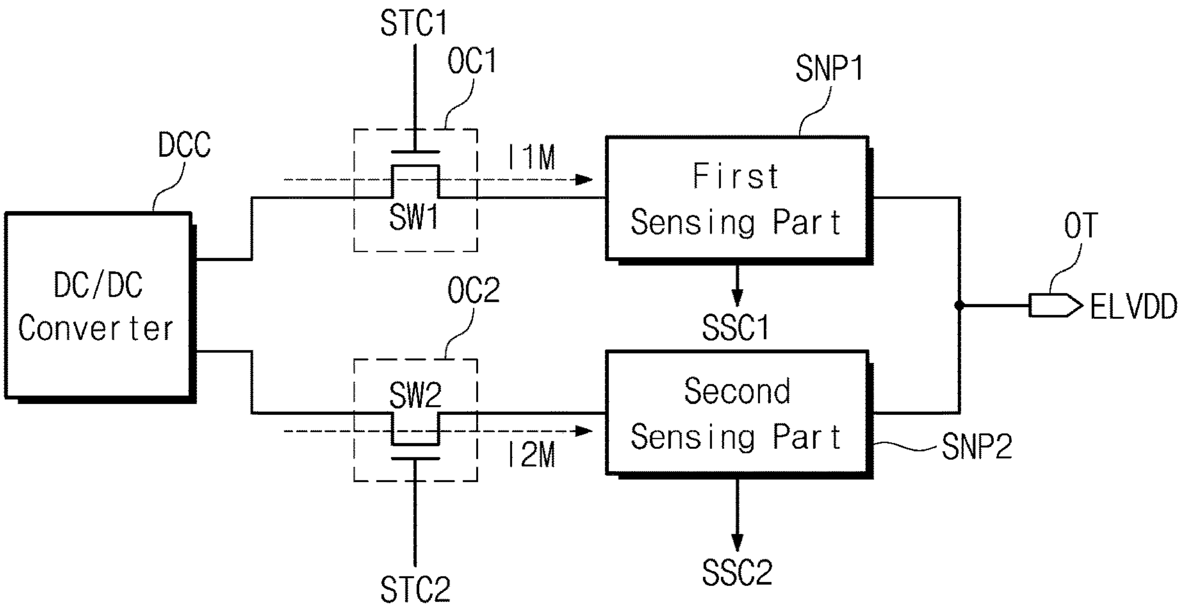
FIG. 9 is a diagram illustrating normal operating states of first and second output parts shown in FIG. 8.
Figure 10:
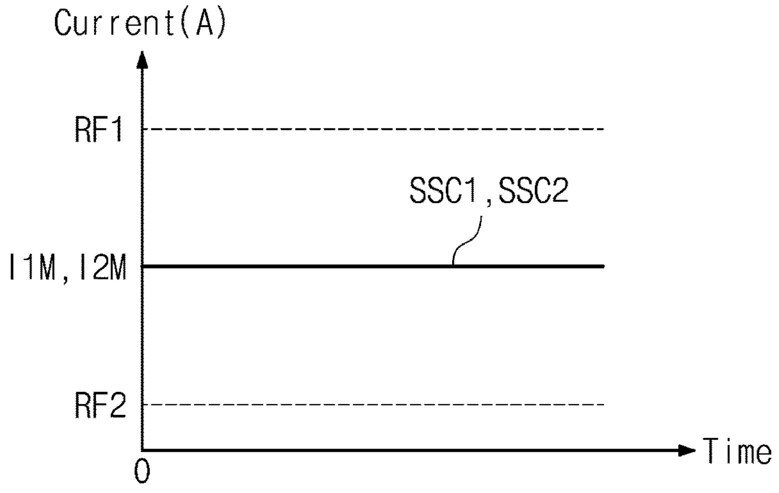
FIG. 10 is a graph illustrating the first and second currents shown in FIG. 9.

FIG. 9 is a diagram illustrating normal operating states of first and second output parts shown in FIG. 8. FIG. 10 is a graph illustrating the first and second currents shown in FIG. 9.

FIG. 9 illustrates the DC/DC converter DCC, the first and second output parts (OC1, OC2), and the first and second sensing parts (SNP1, SNP2).

Referring to FIGS. 9 and 10, when the first and second output parts (OC1, OC2) are in a normal state, the first current I1M may be output through the first output part OC1, and the second current I2M may be output through the second output part OC2. A current, which is generated by summing the first current I1M and the second current I2M and which corresponds to the first voltage ELVDD, may be output through the first voltage output terminal OT.

When the current value flowing through each of the first and second switching elements (SW1, SW2) is greater than a specific value, each of the first and second switching elements (SW1, SW2) may be damaged. Accordingly, the current corresponding to the first voltage ELVDD may be distributed to the first switching element SW1 and the second switching element SW2.

For example, a current value at which each of the first and second switching elements (SW1, SW2) is capable of being damaged may not be less than 21 A. 21 A may be a current value corresponding to the maximum luminance. When the display panel DP displays an image having the maximum luminance, a current of 21 A may be output through the first voltage output terminal OT. An operation in which the display panel DP displays an image having the maximum luminance may be defined as a full white mode.

The output of an operating current may be switched by using one switching element. In this case, when the current of 21 A flows through one switching element during a predetermined time, the amount of heat generated by the one switching element may increase, and thus the one switching element may be damaged.

In an embodiment of the present disclosure, the first and second switching elements (SW1, SW2) may be connected in parallel with each other. The operating current may be distributed through the first and second switching elements (SW1, SW2). Accordingly, the current of 10.5 A may be output through the first switching element SW1, and the current of 10.5 A may be output through the second switching element SW2.

Each of the first current I1M and the second current I2M may have a value of 10.5 A. Each of the first current I1M and the second current I2M may have a value between the first reference value RF1 and the second reference value RF2. Accordingly, the first and second sensing values (SSC1, SSC2) obtained by sensing the first current I1M and the second current I2M may also have values between the first reference value RF1 and the second reference value RF2.

The current flowing through each of the first and second switching elements (SW1, SW2) may be lower than 21 A, thereby preventing the damage to the first and second switching elements (SW1, SW2). That is, the operating current may be distributed and output through the first and second switching elements (SW1, SW2), thereby preventing the damage to the first and second switching elements (SW1, SW2).

At luminance lower than the maximum luminance, the pixels PX may be driven by using a current lower than 21 A. At the luminance lower than the maximum luminance, the current value flowing through each of the first and second switching elements (SW1, SW2) may be lower than 10.5 A. Accordingly, the damage to the first and second switching elements (SW1, SW2) may be further prevented.

Referring to FIGS. 8, 9, and 10, when a condition that one of the first and second sensing values (SSC1, SSC2) is greater than the first reference value RF1 and the other of the first and second sensing values (SSC1, SSC2) is less than the second reference value RF2 is not satisfied, the defect determination part DPD may not count the comparison result.

Figure 11:
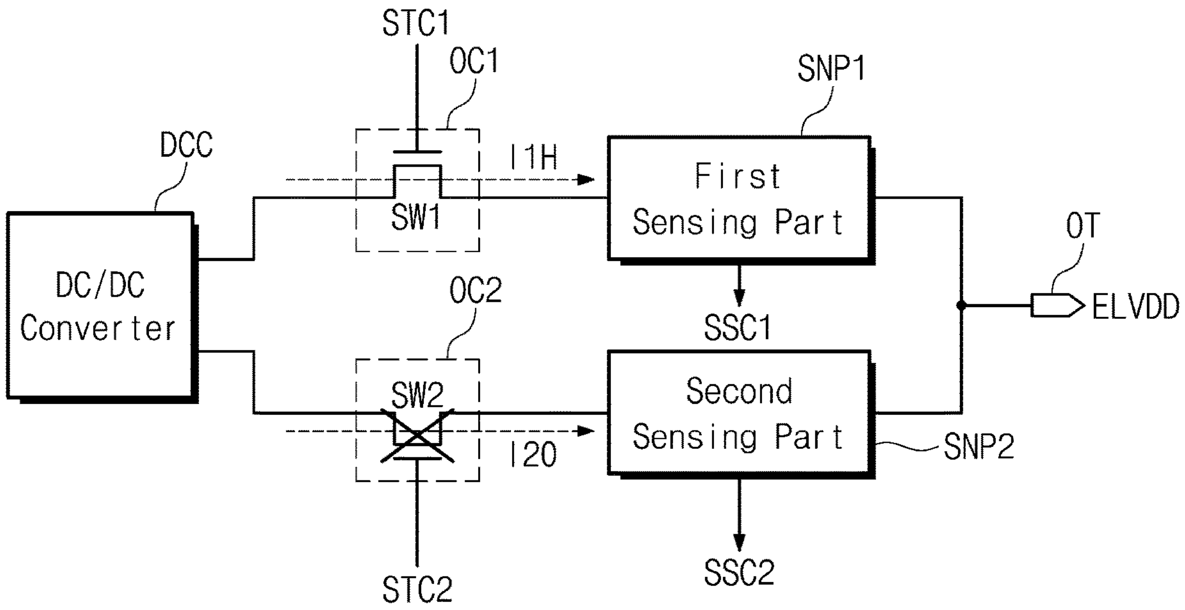
FIG. 11 is a diagram illustrating operating states of the first and second output parts when one of the first and second output parts shown in FIG. 8 is damaged.
Figure 12:
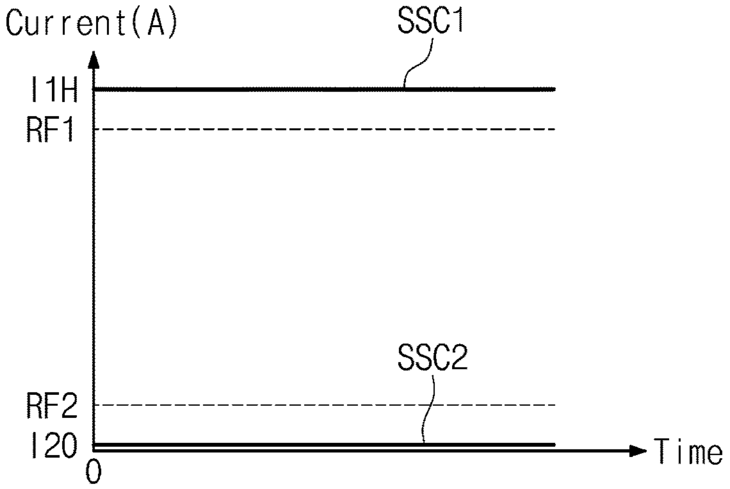
FIG. 12 is a graph illustrating the first and second currents shown in FIG. 11.

FIG. 11 is a diagram illustrating operating states of the first and second output parts when one of the first and second output parts shown in FIG. 8 is damaged. FIG. 12 is a graph illustrating the first and second currents shown in FIG. 11.

Referring to FIGS. 11 and 12, one of the first and second output parts OC1 and OC2 may be damaged. For example, one of the switching elements may be manufactured to have somewhat low durability, or may be damaged by external shocks or various environmental factors. FIG. 11 illustrates that the second output part OC2 is damaged. However, the first output part OC1 may be damaged. The second output part OC2 may be damaged, and thus the second output part OC2 may be opened.

A first current I1H may be output through the first output part OC1. The second current I20 may be output through the second output part OC2. However, because the second output part OC2 is opened, the second current I20 may have a substantially zero value. However, to illustrate the second current I20 through a graph, FIG. 12 illustrates that the second current I20 is adjacent to zero.

Because the second output part OC2 is opened, all currents may be substantially output through the first output part OC1 without distributing an operating current through the first and second output parts (OC1, OC2). When the display panel DP displays an image having the maximum luminance, a current of 21 A may be output through the first voltage output terminal OT. The first current I1H may substantially have a value of 21 A.

The first current I1H may be greater than the first reference value RF1, and the second current I20 may be less than the second reference value RF2. Accordingly, the first sensing value SSC1 obtained by sensing the first current I1H may be greater than the first reference value RF1. The second sensing value SSC2 obtained by sensing the second current I20 may be less than the second reference value RF2.

Referring to FIGS. 8, 11, and 12, when a condition that one of the first and second sensing values (SSC1, SSC2) is greater than the first reference value RF1 and the other of the first and second sensing values (SSC1, SSC2) is less than the second reference value RF2 is satisfied, the defect determination part DPD may count the comparison result. The counting value may correspond to an operating time of the first switching element SW1. When a current of 21 A flows into the first switching element SW1 during a predetermined time, the first switching element SW1 may be damaged.

When each of the first and second output parts (OC1, OC2) outputs a current value greater than the first reference value RF1, the reference counting value may be set to a value corresponding to the minimum operating time for preventing the damage to the first and second output parts (OC1, OC2).

For example, when each of the first and second switching elements (SW1, SW2) outputs a current value greater than the first reference value RF1, an operating time for preventing the damage to each of the first and second output parts (OC1, OC2) may be tested. A value, which is used to prevent the damage to each of the first and second switching elements (SW1, SW2) and which corresponds to the minimum operating time of each of the first and second switching elements (SW1, SW2) may be set as the reference counting value.

When the counting value obtained by counting the comparison result is greater than the reference counting value, the defect determination part DPD may shut down the power supply circuit PWC by outputting the shutdown signal S-DN. Accordingly, because the input voltage Vin is not generated by the power supply circuit PWC, an operation of the first output part OC1 may be stopped. As a result, the first output part OC1 may be protected without being damaged.

Figure 13:
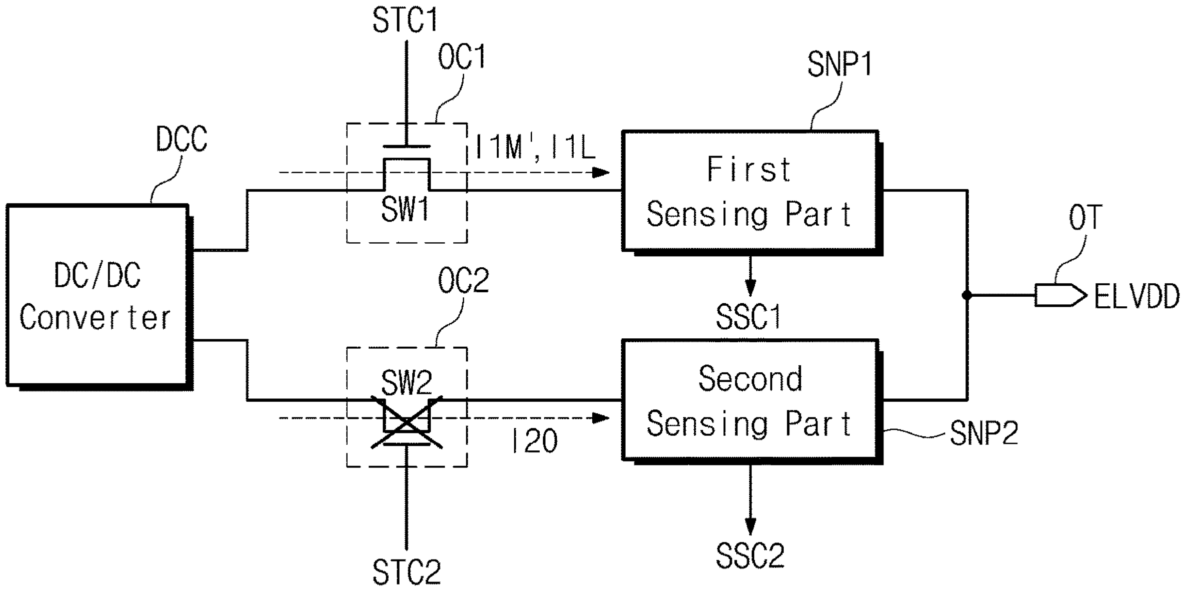
FIG. 13 is a diagram illustrating other operating states of the first and second output parts when one of the first and second output parts shown in FIG. 8 is damaged.
Figure 14:
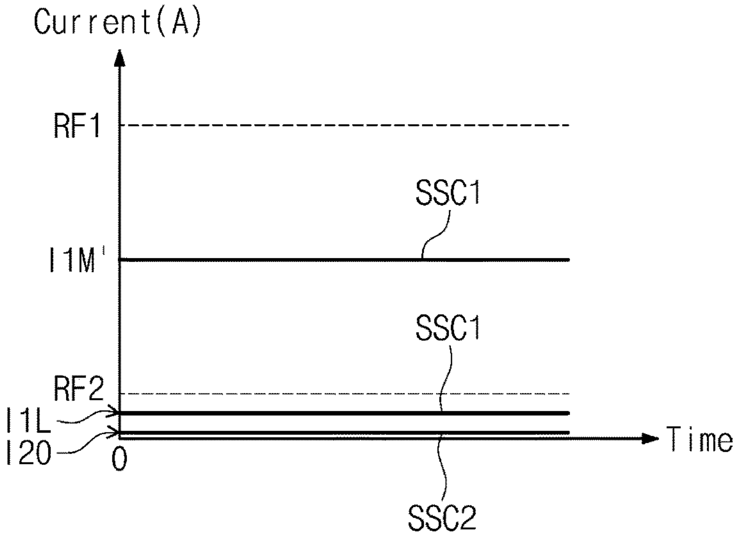
FIG. 14 is a graph illustrating the first and second currents shown in FIG. 13.

FIG. 13 is a diagram illustrating other operating states of the first and second output parts when one of the first and second output parts shown in FIG. 8 is damaged. FIG. 14 is a graph illustrating the first and second currents shown in FIG. 13.

Referring to FIGS. 13 and 14, the second output part OC2 may be damaged, and thus the second output part OC2 may be opened. The first current I1M' or the first current I1L may be output through the first output part OC1. A second current I20 may be output through the second output part OC2. Because the second output part OC2 is opened, the second current I20 may have a substantially zero value.

The display panel DP may display an image having middle luminance lower than the maximum luminance or a minimum luminance lower than the middle luminance. When the display panel DP displays an image having the middle luminance lower than the maximum luminance, the first current I1M' may be output through the first output part OC1.

For example, when the first and second output parts (OC1, OC2) are normal, a current of 10.5 A may be distributed and output through the first and second output parts (OC1, OC2) to display an image having the middle luminance. In this case, each of the first and second output parts (OC1, OC2) may output a current of 5.25 A. However, when the second output part OC2 is opened, the first output part OC1 may output a current of 10.5 A as the first current I1M'. The first current I1M' may not have a current level at which the first output part OC1 is capable of being damaged.

The first current I1M' output through the first output part OC1 may have a value between the first reference value RF1 and the second reference value RF2. The second current I20 may have a value less than the second reference value RF2. The first sensing value SSC1 obtained by sensing the first current I1M' has a value between the first reference value RF1 and the second reference value RF2. The second sensing value SSC2 obtained by sensing the second current I20 may be less than the second reference value RF2.

Referring to FIGS. 8, 13, and 14, when a condition that one of the first and second sensing values (SSC1, SSC2) is greater than the first reference value RF1 and the other of the first and second sensing values (SSC1, SSC2) is less than the second reference value RF2 is not satisfied, the defect determination part DPD may not count the comparison result. That is, as shown in FIG. 14, when one of the first and second sensing values (SSC1, SSC2) is less than or equal to the first reference value RF1 and is greater than or equal to the second reference value RF2, and the other of the first and second sensing values (SSC1, SSC2) is less than the second reference value RF2, the defect determination part DPD may not count the comparison result.

Referring to FIGS. 13 and 14, when the display panel DP displays an image having the minimum luminance, the first current I1L may be output through the first output part OC1. An operation in which the display panel DP displays an image having the minimum luminance may be defined as a black mode.

For example, when the first and second output parts (OC1, OC2) are normal, a current of 0.1 A may be distributed and output through the first and second output parts (OC1, OC2) to display an image having the minimum luminance. In this case, each of the first and second output parts (OC1, OC2) may output a current of 0.05 A. However, when the second output part OC2 is opened, the first output part OC1 may output a current of 0.1 A as the first current I1L. The first current I1L may not have a current level at which the first output part OC1 is capable of being damaged.

The first current I1L output through the first output part OC1 may have a value less than the second reference value RF2. The second current I20 may have a value less than the second reference value RF2. Each of the first sensing value SSC1 obtained by sensing the first current I1L and the second sensing value SSC2 obtained by sensing the second current I20 may be less than the second reference value RF2.

Referring to FIGS. 8, 13, and 14, when a condition that one of the first and second sensing values (SSC1, SSC2) is greater than the first reference value RF1 and the other of the first and second sensing values (SSC1, SSC2) is less than the second reference value RF2 is not satisfied, the defect determination part DPD may not count the comparison result. That is, as shown in FIG. 14, when the first and second sensing values (SSC1, SSC2) are less than the second reference value RF2, the defect determination part DPD may not count the comparison result.

In an embodiment of the present disclosure, when one of the first and second output parts (OC1, OC2) is damaged, an operating current may be output through the other output part. When the operating current output through the other output part is not at a level at which the other output part is incapable of being damaged, the display device DD may operate normally.

Figure 15:
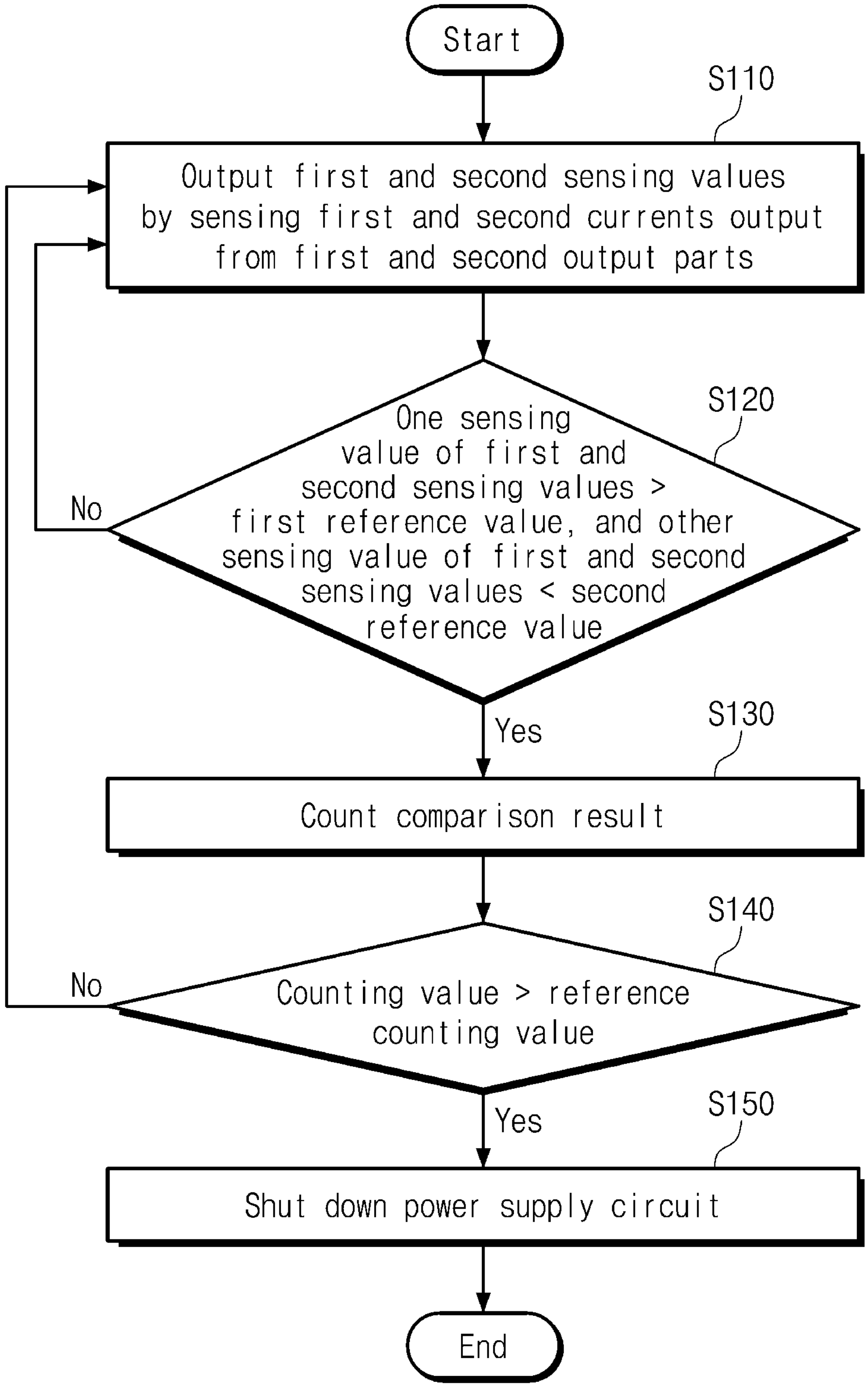
FIG. 15 is a flowchart for describing a driving method of a display device including the voltage generator and the timing controller shown in FIG. 8.

FIG. 15 is a flowchart for describing a driving method of a display device including the voltage generator and the timing controller shown in FIG. 8.

Referring to FIG. 15, in operation S110, the first and second currents (I1, I2) output from the first and second output parts (OC1, OC2) may be sensed and may be output as first and second sensing values (SSC1, SSC2). When the first voltage ELVDD is applied to the pixels PX through the first voltage output terminal OT connected to the output terminals of the first and second output parts (OC1, OC2), the first and second currents (I1, I2) may be sensed.

In operation S120, the first and second sensing values (SSC1, SSC2) may be compared with the first and second reference values (RF1, RF2). For example, when the first and second reference values (RF1, RF2) are generated, one sensing value of the first and second sensing values (SSC1, SSC2) is greater than the first reference value RF1, and the other sensing value of the first and second sensing values (SSC1, SSC2) is less than the second reference value RF2, in operation S130, a comparison result may be counted.

In operation S120, when a condition that one of the first and second sensing values (SSC1, SSC2) is greater than the first reference value RF1, and the other of the first and second sensing values (SSC1, SSC2) is less than the second reference value RF2 is not satisfied, a procedure may proceed to operation S110, and the first and second currents (I1, I2) may be sensed.

In the following operations, the shutdown of the power supply circuit PWC may be controlled depending on the comparison result. In detail, in operation S140, it may be checked whether a counting value obtained by counting the comparison result is greater than a reference counting value. In operation S140, when the counting value is greater than the reference counting value, the procedure may proceed to operation S150.

In operation S150, the shutdown signal S-DN for shutting down the power supply circuit PWC may be output to the power supply circuit PWC, and thus the power supply circuit PWC may be shut down. When the counting value is not greater than the reference counting value in operation S140, the procedure may proceed to operation S110 and the first and second currents (I1, I2) may be sensed.

Figure 16:
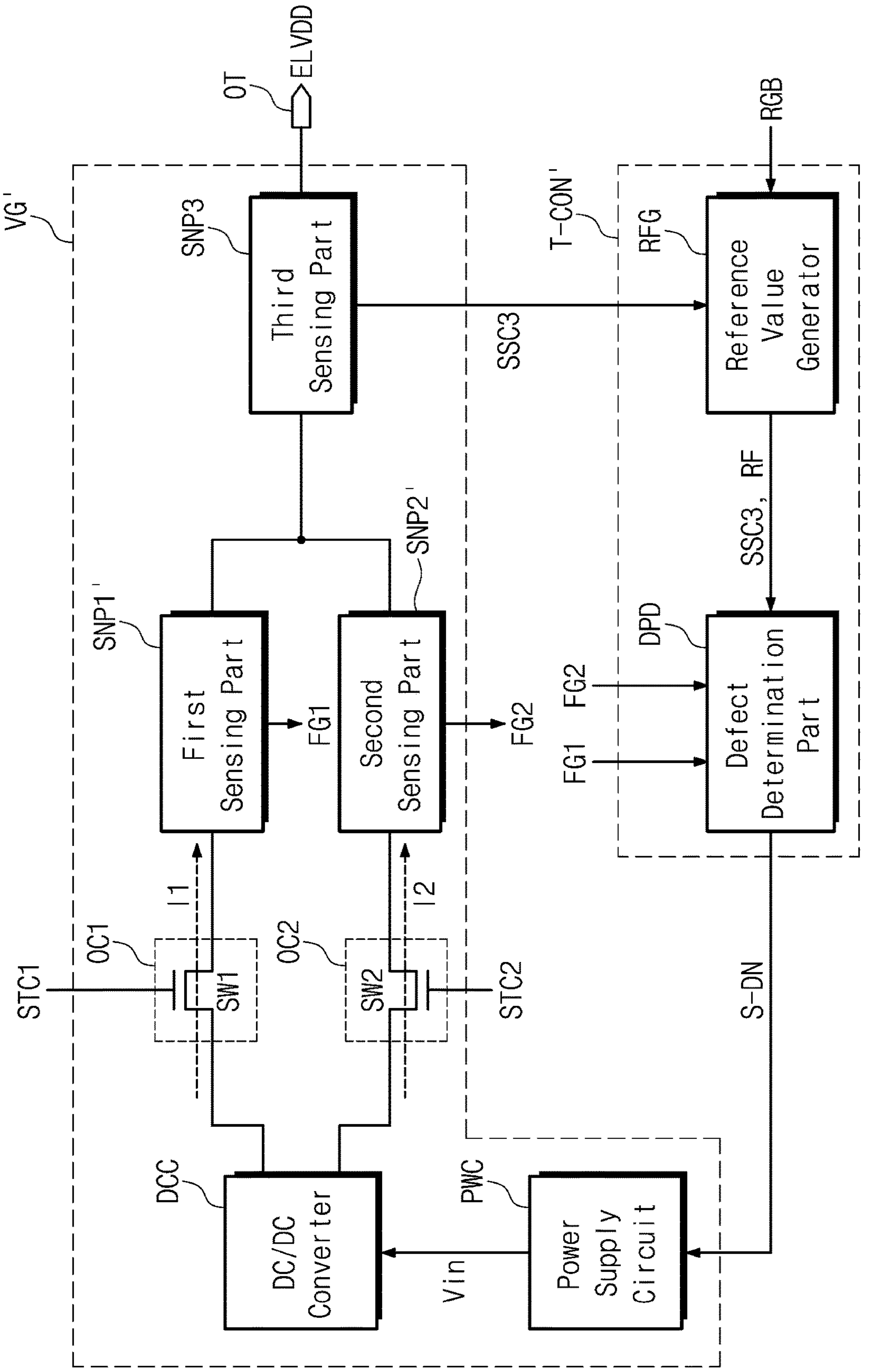
FIG. 16 is a diagram illustrating a configuration of the voltage generator and timing controller shown in FIG. 1, according to an embodiment.

FIG. 16 is a diagram illustrating a configuration of the voltage generator and timing controller shown in FIG. 1, according to an embodiment.

Hereinafter, in a configuration of a voltage generator VG' and a timing controller T-CON' shown in FIG. 16, a configuration different from the configuration shown in FIG. 8 will be mainly described.

Referring to FIG. 16, a first sensing part SNP1' may sense an open state of the first output part OC1. A second sensing part SNP2' may sense an open state of the second output part OC2. The first and second sensing parts (SNP1, SNP2) shown in FIG. 8 may sense current values output from the first and second output parts (OC1, OC2). However, the first and second sensing parts (SNP1', SNP2') shown in FIG. 16 may detect only open states of the first and second output parts (OC1, OC2).

The first sensing part SNP1' may output a first sensing value FG1 by sensing the open state of the first output part OC1. The second sensing part SNP2' may output a second sensing value FG2 by sensing the open state of the second output part OC2. The first and second sensing values (FG1, FG2) may be flag signals. For example, the flag signal of "1" may indicate an open state, and the flag signal of "0" may indicate a normal state. The first and second sensing values (FG1, FG2) may be provided to the defect determination part DPD.

The voltage generator VG' may further include a third sensing part SNP3. The third sensing part SNP3 may be connected to the first and second sensing parts (SNP1', SNP2') in common. The first voltage output terminal OT may be connected to the third sensing part SNP3. The third sensing part SNP3 may be positioned between the first voltage output terminal OT and the first and second sensing parts (SNP1', SNP2') and may be connected in series to the first voltage output terminal OT. The third sensing part SNP3 may sense the current output through the first voltage output terminal OT and may output a third sensing value SSC3.

The reference value generator RFG may generate a reference value RF and may receive the third sensing value SSC3. The reference value generator RFG may sense a current of the first voltage output terminal OT through the third sensing part SNP3 and may provide the sensed result to the defect determination part DPD. The reference value generator RFG may provide the reference value RF and the third sensing value SSC3 to the defect determination part DPD.

The reference value generator RFG may generate the reference value RF based on pieces of current data corresponding to pieces of image data, and may provide the generated reference value RF to the defect determination part DPD. The reference value RF may be set to a value less than the maximum value and greater than the minimum value among pieces of current data.

When the first sensing value FG1 or the second sensing value FG2 indicates an open state, the defect determination part DPD may control the shutdown of the power supply circuit PWC by comparing the third sensing value SSC3 with the reference value RF. For example, when the first sensing value FG1 or the second sensing value FG2 indicates an open state, and the third sensing value SSC3 is greater than the reference value RF, the defect determination part DPD may count the comparison result.

When the counting value is greater than the reference counting value, the defect determination part DPD may output the shutdown signal S-DN to the power supply circuit PWC. The power supply circuit PWC may be shut down in response to the shutdown signal S-DN. When the third sensing value SSC3 is less than or equal to the reference value RF, the defect determination part DPD may not count the comparison result. Hereinafter, this operation will be described in detail.

Figure 17:
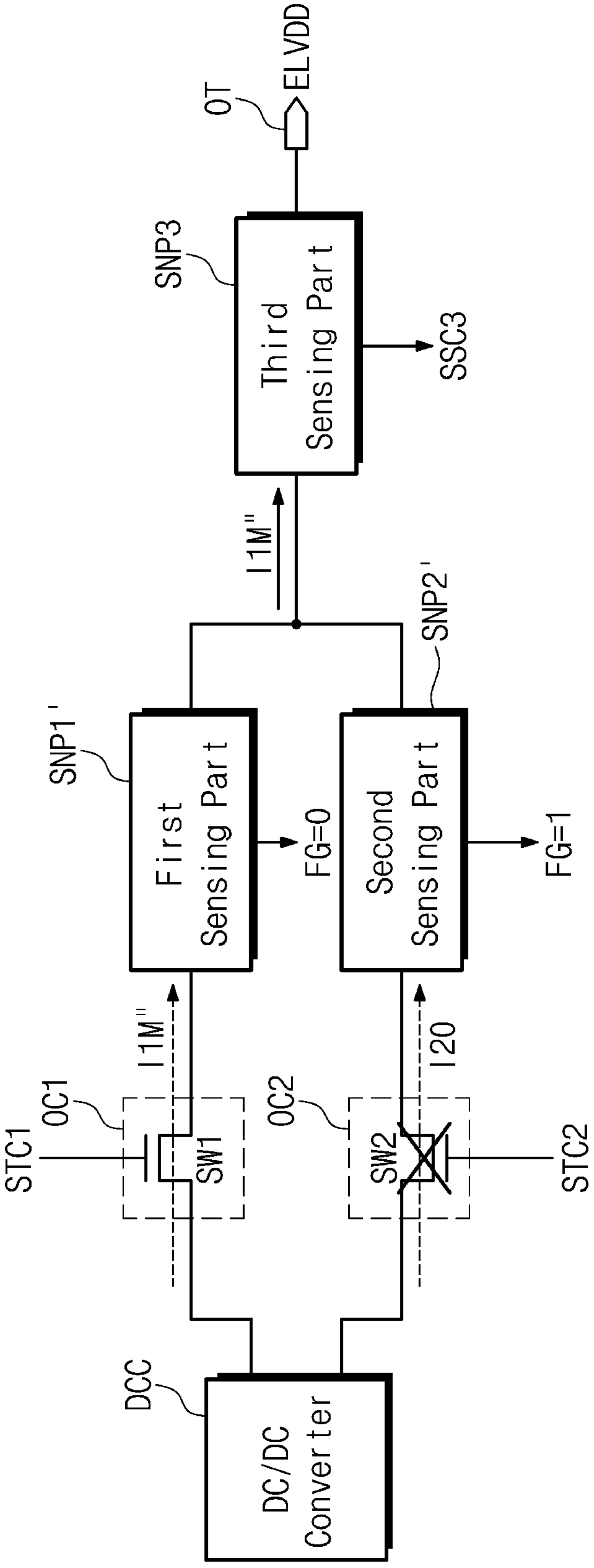
FIG. 17 is a diagram illustrating operating states of the first and second output parts when one of the first and second output parts shown in FIG. 16 is damaged.
Figure 18:
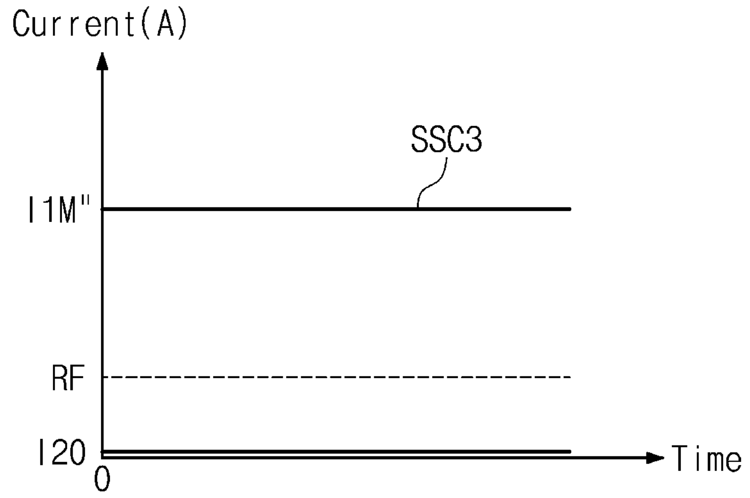
FIG. 18 is a graph illustrating the first and second currents shown in FIG. 17.

FIG. 17 is a diagram illustrating operating states of the first and second output parts when one of the first and second output parts shown in FIG. 16 is damaged. FIG. 18 is a graph illustrating the first and second currents shown in FIG. 17.

Referring to FIGS. 17 and 18, the first output part OC1 may be in a normal state, and the second output part OC2 may be in an open state because the second output part OC2 is damaged. A first current I1M" may be output through the first output part OC1. The second current I20, which is substantially a value of 0, may be output through the second output part OC2. Because the second output part OC2 is opened, all currents may be substantially output through the first output part OC1 without distributing an operating current through the first and second output parts (OC1, OC2).

The first output part OC1 may be in a normal state, and thus the first sensing value FG1 of the first sensing part SNP1' may be "0". The second output part OC2 may be in an open state, and thus the second sensing value FG2 of the second sensing part SNP2' may be "1".

The first current I1M" may be output through the first voltage output terminal OT. The third sensing part SNP3 may output the third sensing value SSC3 by sensing the first current I1M". Accordingly, when the second output part OC2 is opened, the first current I1M" output through the first output part OC1 may be sensed. The first current I1M" may be greater than the reference value RF. Accordingly, the third sensing value SSC3 may be greater than the reference value RF.

Referring to FIGS. 16, 17, and 18, when the second sensing value FG2 among the first and second sensing values (FG1, FG2) indicates an open state, and the third sensing value SSC3 is greater than the reference value RF, the defect determination part DPD may count the comparison result. When the counting value obtained by counting the comparison result is greater than the reference counting value, the defect determination part DPD may shut down the power supply circuit PWC by outputting the shutdown signal S-DN.

The cost of the first and second sensing parts (SNP1', SNP2') for sensing only the open state shown in FIG. 16 may be lower than that of the first and second sensing parts (SNP1, SNP2) for precisely sensing the output currents shown in FIG. 8.

When the first and second sensing parts (SNP1', SNP2') are used, only the open states of the first and second output parts (OC1, OC2) may be simply sensed without precisely sensing output currents of the first and second output parts (OC1, OC2). When one of the first and second output parts (OC1, OC2) is opened, the current output through the other output part may be sensed by the first voltage output terminal OT. Accordingly, the current of the other output part that normally outputs the current may be sensed, and thus an operation of protecting the other output part may be performed.

When it is determined that the output current of the first voltage output terminal OT is greater than a specific value (e.g., the reference value RF), by sensing the output current of the first voltage output terminal OT, an operation for protecting the first output part OC1 may be performed. When the third sensing value SSC3 is greater than the reference value RF because the reference value RF is less than the maximum value among pieces of current data, an operation for protecting the first output part OC1 may be performed.

Figure 19:
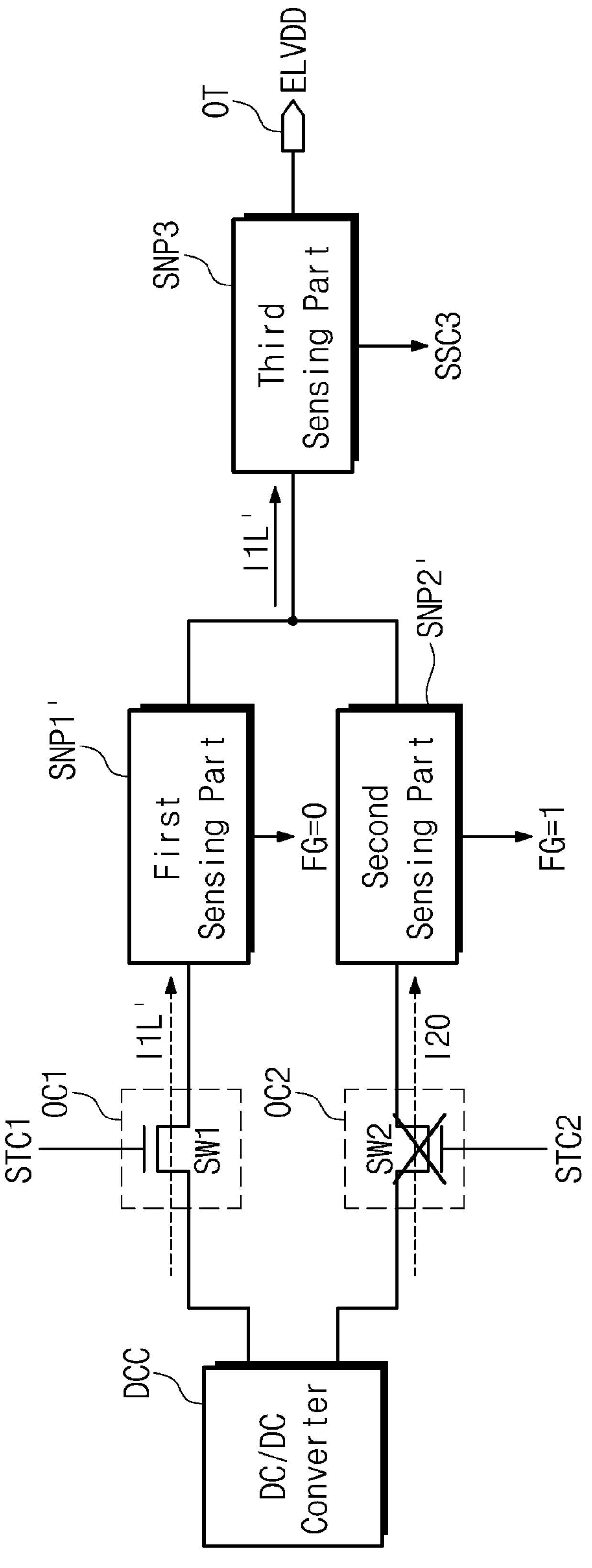
FIG. 19 is a diagram illustrating other operating states of the first and second output parts when one of the first and second output parts shown in FIG. 16 is damaged.
Figure 20:
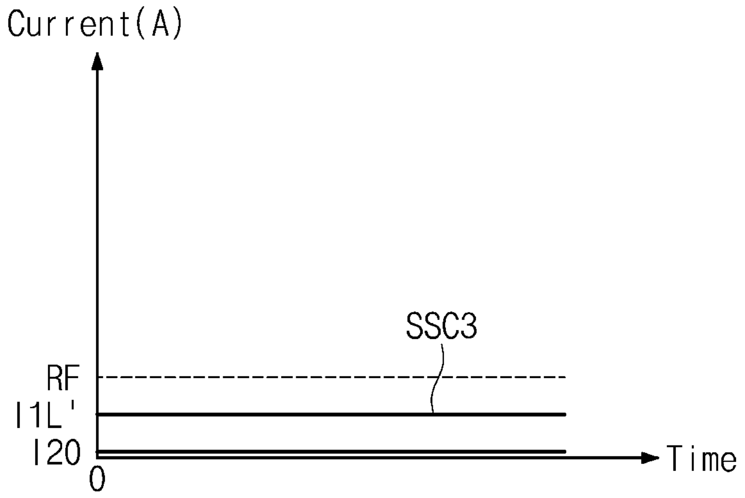
FIG. 20 is a graph illustrating the first and second currents shown in FIG. 19.

FIG. 19 is a diagram illustrating other operating states of the first and second output parts when one of the first and second output parts shown in FIG. 16 is damaged. FIG. 20 is a graph illustrating the first and second currents shown in FIG. 19.

Referring to FIGS. 19 and 20, the first output part OC1 may be in a normal state, and the second output part OC2 may be in an open state because the second output part OC2 is damaged. A first current I1L' may be output through the first output part OC1. The second current I20, which is substantially a value of 0, may be output through the second output part OC2. The first sensing value FG1 of the first sensing part SNP1' may be "0". The second sensing value FG2 of the second sensing part SNP2' may be "1".

The first current I1L' may be output through the first voltage output terminal OT. The third sensing part SNP3 may output the third sensing value SSC3 by sensing the first current I1L'. Accordingly, when the second output part OC2 is opened, the first current I1L' output through the first output part OC1 may be sensed. The first current I1L' may be less than the reference value RF. Accordingly, the third sensing value SSC3 may be less than the reference value RF.

All currents may be substantially output through the first output part OC1 without distributing the operating current through the first and second output parts (OC1, OC2). However, the first current I1L' less than the reference value RF may not have a current value of a level at which the first output part OC1 is capable of being damaged.

Referring to FIGS. 16, 19, and 20, when the second sensing value FG2 among the first and second sensing values (FG1, FG2) indicates an open state, and the third sensing value SSC3 is less than the reference value RF, the defect determination part DPD may not count the comparison result. That is, even though one of the first and second output parts (OC1, OC2) is opened, when the output current output through the other output part has a level at which an output part is not damaged, the display device DD may operate normally.

When the third sensing value SSC3 is less than the reference value RF, an operation of the defect determination part DPD is described. However, even when the third sensing value SSC3 is the same as the reference value RF, the defect determination part DPD may not count the comparison result.

Figure 21:
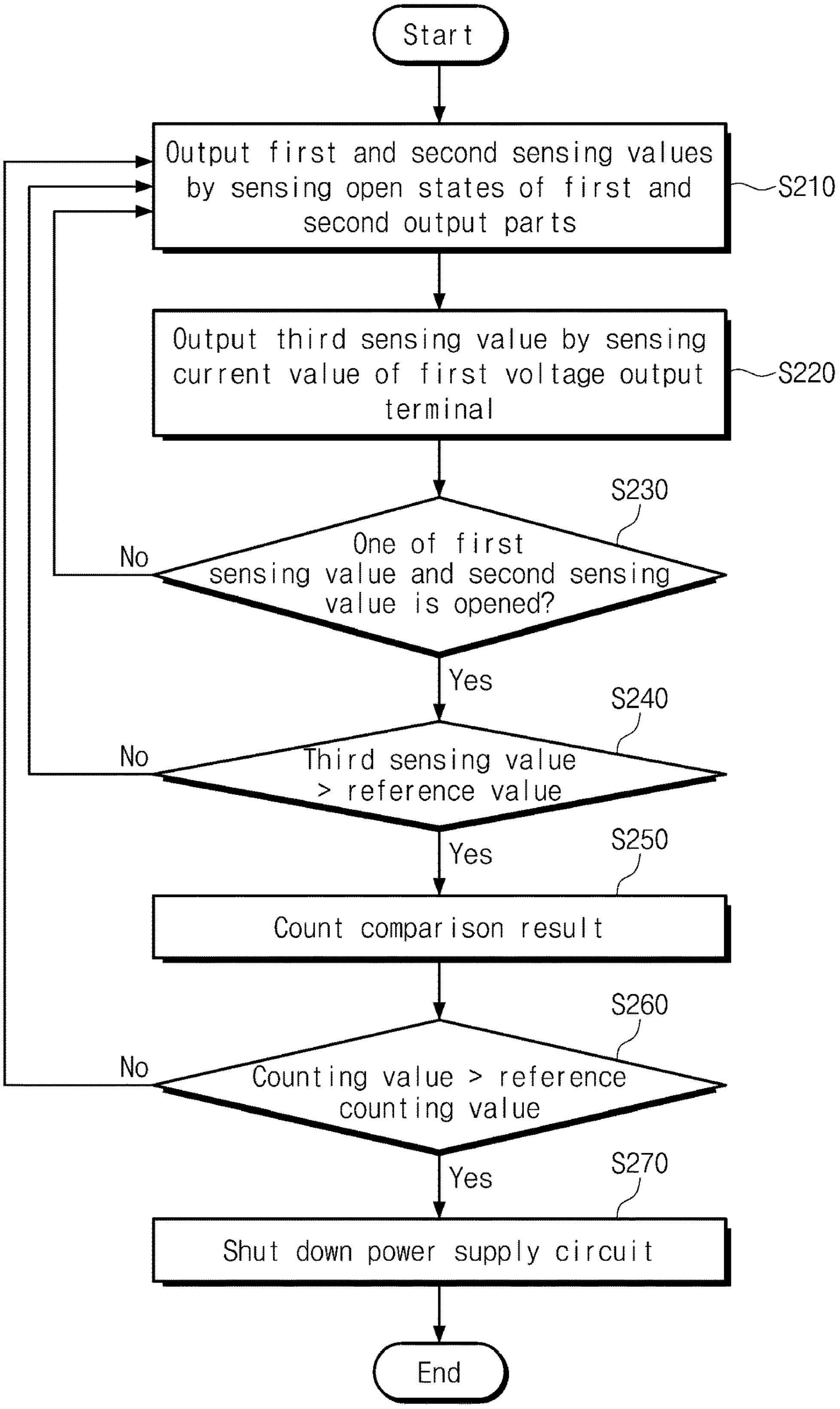
FIG. 21 is a flowchart for describing a method for driving a display device including the voltage generator and timing controller shown in FIG. 16.

FIG. 21 is a flowchart for describing a method for driving a display device including the voltage generator and timing controller shown in FIG. 16.

Referring to FIG. 21, in operation S210, open states of the first and second output parts (OC1, OC2) may be sensed and may be output as first and second sensing values (FG1, FG2). When the first voltage ELVDD is applied to pixels PX through the first voltage output terminal OT connected to the output terminals of the first and second output parts (OC1, OC2), open states of the first and second output parts (OC1, OC2) may be sensed.

In operation S220, the current value of the first voltage output terminal OT may be sensed and output as the third sensing value SSC3. In operation S230, when the first sensing value FG1 or the second sensing value FG2 indicates an open state, a procedure may proceed to operation S240, and the third sensing value SSC3 may be compared with the reference value RF. When the first and second sensing values (FG1, FG2) do not indicate an open state in operation S230, a procedure may proceed to operation S210.

When the third sensing value SSC3 is greater than the reference value RF in operation S240, the comparison result may be counted in operation S250. When the third sensing value SSC3 is not greater than the reference value RF in operation S240, that is, when the third sensing value SSC3 is less than or equal to the reference value RF, the comparison result may not be counted, and the procedure may proceed to operation S210.

In the following operations, the shutdown of the power supply circuit PWC may be controlled depending on the comparison result. In detail, when the counting value obtained by counting the comparison result is greater than the reference counting value in operation S260, the procedure may proceed to operation S270. In operation S270, the shutdown signal S-DN for shutting down the power supply circuit PWC may be output to the power supply circuit PWC, and thus the power supply circuit PWC may be shut down. In operation S260, when the counting value is not greater than the reference counting value, the procedure may proceed to operation S210.

Although described above with reference to an embodiment, it will be understood by those skilled in the art that various modifications and changes may be made in the present disclosure without departing from the spirit and scope of the present disclosure as set forth in the claims below. Furthermore, embodiments of the present disclosure are not intended to limit the technical spirit of the present disclosure. All technical spirits within the scope of the following claims and all equivalents thereof should be construed as being included within the scope of the present disclosure.

According to an embodiment of the present disclosure, when one of the first and second output parts is damaged and a high current is output through the other output part, a power supply circuit is shut down, thereby protecting the remaining output part. Also, when an operation of displaying a middle grayscale or a low grayscale is performed, a display device may operate normally by outputting a current through the remaining output part.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:
a first output part;
a second output part;
a power supply circuit;
a voltage level converter that converts a level of the voltage received from the power supply circuit and is connected to input terminals of the first output part and the second output part;
a first sensing part connected to an output terminal of the first output part;
a second sensing part connected to an output terminal of the second output part;
a first voltage output terminal connected to the first sensing part and the second sensing part;
a plurality of pixels connected to the first voltage output terminal and configured to display an image; and
a defect determination part configured to control shutdown of the power supply circuit by comparing a first sensing value and a second sensing value, which are received from the first sensing part and the second sensing part, with a first reference value and a second reference value which is lower than the first reference value.

2. The display device of claim 1, wherein, when one of the first sensing value and the second sensing value is greater than the first reference value, and the other of the first sensing value and the second sensing value is less than the second reference value, the defect determination part counts the comparison result.

3. The display device of claim 2, wherein, when the counting value is greater than a reference counting value, the defect determination part shuts down the power supply circuit.

4. The display device of claim 3, wherein, when each of the first output part and the second output part outputs a current value greater than the first reference value, the reference counting value is set to a value corresponding to a minimum operating time at which the first output part and the second output part are not damaged.

5. The display device of claim 1, further comprising:

a reference value generator configured to generate the first reference value and the second reference value based on pieces of current data corresponding to pieces of image data and to provide the defect determination part with the first reference value and the second reference value.

6. The display device of claim 5, wherein the first reference value is less than a maximum value among the pieces of current data.

7. The display device of claim 5, wherein the second reference value is greater than a minimum value among the pieces of current data.

8. The display device of claim 1, wherein the first sensing part outputs the first sensing value by sensing a first current output through the first output part, and wherein the second sensing part outputs the second sensing value by sensing a second current output through the second output part.

9. The display device of claim 1, wherein, when each of the first sensing value and the second sensing value is less than the second reference value, the defect determination part does not count the comparison result.

10. The display device of claim 1, wherein one of the first sensing value and the second sensing value is less than or equal to the first reference value and is greater than or equal to the second reference value and the other of the first sensing value and the second sensing value is less than the second reference value, the defect determination part does not count the comparison result.

11. A display device comprising:

a first output part;

a second output part;

a power supply circuit;

a voltage level converter that converts a level of the voltage received from the power supply circuit and is connected to input terminals of the first output part and the second output part;

a first sensing part connected to an output terminal of the first output part and configured to sense an open state of the first output part;

a second sensing part connected to an output terminal of the second output part and configured to sense an open state of the second output part;

a third sensing part connected to the first sensing part and the second sensing part;

a first voltage output terminal connected to the third sensing part;

a plurality of pixels connected to the first voltage output terminal and configured to display an image; and a defect determination part configured to control shutdown of the power supply circuit by comparing a reference value with a third sensing value received from the third sensing part, when one of a first sensing value and a second sensing value, which are provided from the first sensing part and the second sensing part, indicates an open state.

12. The display device of claim 11, wherein, when the third sensing value is greater than the reference value, the defect determination part counts the comparison result, and wherein, when the counting value is greater than reference counting value, the defect determination part shuts down the power supply circuit.

13. The display device of claim 11, wherein, when the third sensing value is less than or equal to the reference value, the defect determination part does not count the comparison result.

14. The display device of claim 11, further comprising:

a reference value generator configured to receive the third sensing value and to provide the third sensing value to the defect determination part, and configured to generate the reference value based on pieces of current data corresponding to pieces of image data, and to provide the reference value to the defect determination part, wherein the reference value is set to a value, which is less than a maximum value and is greater than a minimum value, from among the pieces of current data.

* * * * *